(12) United States Patent
Tanaka

(10) Patent No.: US 6,795,061 B2
(45) Date of Patent: Sep. 21, 2004

(54) COORDINATE INPUT APPARATUS, CONTROL METHOD THEREFOR AND COMPUTER-READABLE MEMORY

(75) Inventor: Atsushi Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 09/918,461

(22) Filed: Aug. 1, 2001

(65) Prior Publication Data

US 2002/0075386 A1 Jun. 20, 2002

(30) Foreign Application Priority Data

Aug. 7, 2000 (JP) ........................................ 2000-239106

(51) Int. Cl.[7] .......................... G09G 5/08; G03B 21/00
(52) U.S. Cl. ...................................... 345/175; 353/122
(58) Field of Search ................................. 345/157, 158, 345/175, 182; 353/122

(56) References Cited

U.S. PATENT DOCUMENTS

| | | | | |
|---|---|---|---|---|
| 5,115,230 A | | 5/1992 | Smoot ........................ 340/707 |
| 5,502,459 A | * | 3/1996 | Marshall et al. ............ 345/158 |
| 5,504,501 A | * | 4/1996 | Hauck et al. ................ 345/158 |
| 5,570,299 A | | 10/1996 | Tokioka et al. .............. 364/560 |
| 5,570,302 A | | 10/1996 | Kobayashi et al. .......... 364/561 |
| 5,748,183 A | | 5/1998 | Yoshimura et al. ......... 345/173 |
| 5,914,783 A | * | 6/1999 | Barrus ......................... 356/614 |
| 6,056,408 A | * | 5/2000 | Kobayashi ................... 353/122 |
| 6,229,601 B1 | | 5/2001 | Hasegawa ................. 356/141.5 |
| 6,275,214 B1 | * | 8/2001 | Hansen ........................ 345/158 |
| 6,323,839 B1 | * | 11/2001 | Fukuda et al. .............. 345/157 |
| 6,331,848 B1 | * | 12/2001 | Stove et al. ................. 345/156 |
| 6,346,933 B1 | * | 2/2002 | Lin ............................. 345/157 |
| 6,377,241 B1 | * | 4/2002 | Kage et al. ................. 345/158 |

FOREIGN PATENT DOCUMENTS

| | | |
|---|---|---|
| JP | 6-274266 | 9/1994 |
| JP | 7-76902 | 8/1995 |
| JP | 2503182 | 3/1996 |
| JP | 11-219253 | 8/1999 |

* cited by examiner

Primary Examiner—Richard Hjerpe
Assistant Examiner—M. Fatahiyar
(74) Attorney, Agent, or Firm—Fitzpatrick, Cella, Harper & Scinto

(57) ABSTRACT

The outputs from a coordinate detector obtained by irradiating a plurality of predetermined positions on a coordinate input screen are stored in correspondence with each position of the coordinate input screen for a projection display section. The position of the coordinate input screen is designated by a switch. On the basis of output information from the coordinate detector, which corresponds to the designated position, the coordinate values of a light spot on the coordinate input screen are calculated by a coordinate calculation section.

9 Claims, 24 Drawing Sheets

COORDINATE INPUT APPARATUS, CONTROL METHOD THEREFOR AND COMPUTER-READABLE MEMORY

FIELD OF THE INVENTION

The present invention relates to a coordinate input apparatus having a projection display section for irradiating a coordinate input screen with light from a pointing device to generate a light spot, generating coordinates corresponding to the light spot, and displaying an image on the coordinate input screen, a control method therefor, and a computer-readable memory.

BACKGROUND OF THE INVENTION

Conventionally, a coordinate input apparatus which senses a light spot on a screen using a CCD area sensor or linear sensor, executes image processing using, e.g., barycentric coordinates or pattern matching, and calculates and outputs coordinate values, or a coordinate input apparatus using a position detection element (an analog device capable of obtaining an output voltage corresponding to the position of a spot) called a PSD is known.

For example, Japanese Patent Publication No. 7-76902 discloses an apparatus which senses a light spot formed by a parallel beam of visible light with a video camera to detect coordinates and simultaneously transmits/receives a control signal by infrared diffused light. Japanese Patent Laid-Open No. 6-274266 discloses an apparatus for detecting coordinates using a linear CCD sensor and special optical mask.

Japanese Patent No. 2,503,182 discloses the arrangement of an apparatus using a PSD and an output coordinate correction method for the apparatus.

A recent wide-screen display is increasing in screen size and resolution as well as in brightness. Hence, the resolving power of a coordinate input apparatus must also be improved.

Conventionally, a coordinate input apparatus of this type has, as main components, a pointing device for forming a light spot on a screen serving as a coordinate input surface and a coordinate detector for detecting the coordinate position of the light spot on the screen, and additionally as an output device, a projection display device which displays an image or coordinate position on the screen, as described in Japanese Patent Laid-Open No. 11-219253. A compact and inexpensive apparatus which uses a ring CCD as a coordinate detector and is resistant against disturbance light has been proposed.

In this coordinate input apparatus, a cylindrical lens or the like is laid out in front of the ring CCD, thereby inputting light incident on the entire input screen to the ring CCD.

For example, light components input to the same X-coordinate are input to CCD pixels linearly arranged along the X-axis through different paths depending on the position. At this time, the imaging position or input light intensity distribution changes depending on, e.g., the aberration of the lens or a variation between individual lenses. This may cause an error in coordinate values detected by the CCD pixels. Instead, when CCD output values of a plurality of known coordinate points on the screen are stored in a nonvolatile memory, and coordinates are calculated on the basis of the CCD output values, the accuracy can be improved.

Additionally, in the coordinate input apparatus of this type, since the screen size can easily be changed by changing the distance between the projection display device and the screen, the screen size may be changed by user option after shipment from the factory.

In this case, no problem is posed when the optical axis of the projection display device of the coordinate input apparatus matches that of the coordinate detector. However, if the optical axes do not match, the coordinate calculation using the CCD output values stored in the nonvolatile memory generates a considerable deviation in coordinate values.

SUMMARY OF THE INVENTION

The present invention has been made in consideration of the above problems, and has as its object to provide an accurate coordinate input apparatus, control method therefor, and a computer-readable memory.

According to the present invention, the foregoing object is attained by providing a coordinate input apparatus which detects light from a pointing device, with which a coordinate input screen is irradiated, by a coordinate detector, thereby generating a coordinate output signal corresponding to a position on the coordinate input screen, which is irradiated with the light, comprising: storage means for storing a plurality of coordinate values corresponding to outputs from the coordinate detector which are obtained by irradiating a plurality of predetermined positions on the coordinate input screen with the light; selection means for selecting coordinate values from the plurality of coordinate values stored by the storage means; and arithmetic means for calculating the position on the coordinate input screen, which is irradiated with the light, on the basis of the selected coordinate values.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

The embodiment of the present invention will be described below in detail with reference to the accompanying drawings.

The schematic arrangement of an optical coordinate input apparatus according to the present invention will be described first with reference to FIG. 1.

Figure 1:
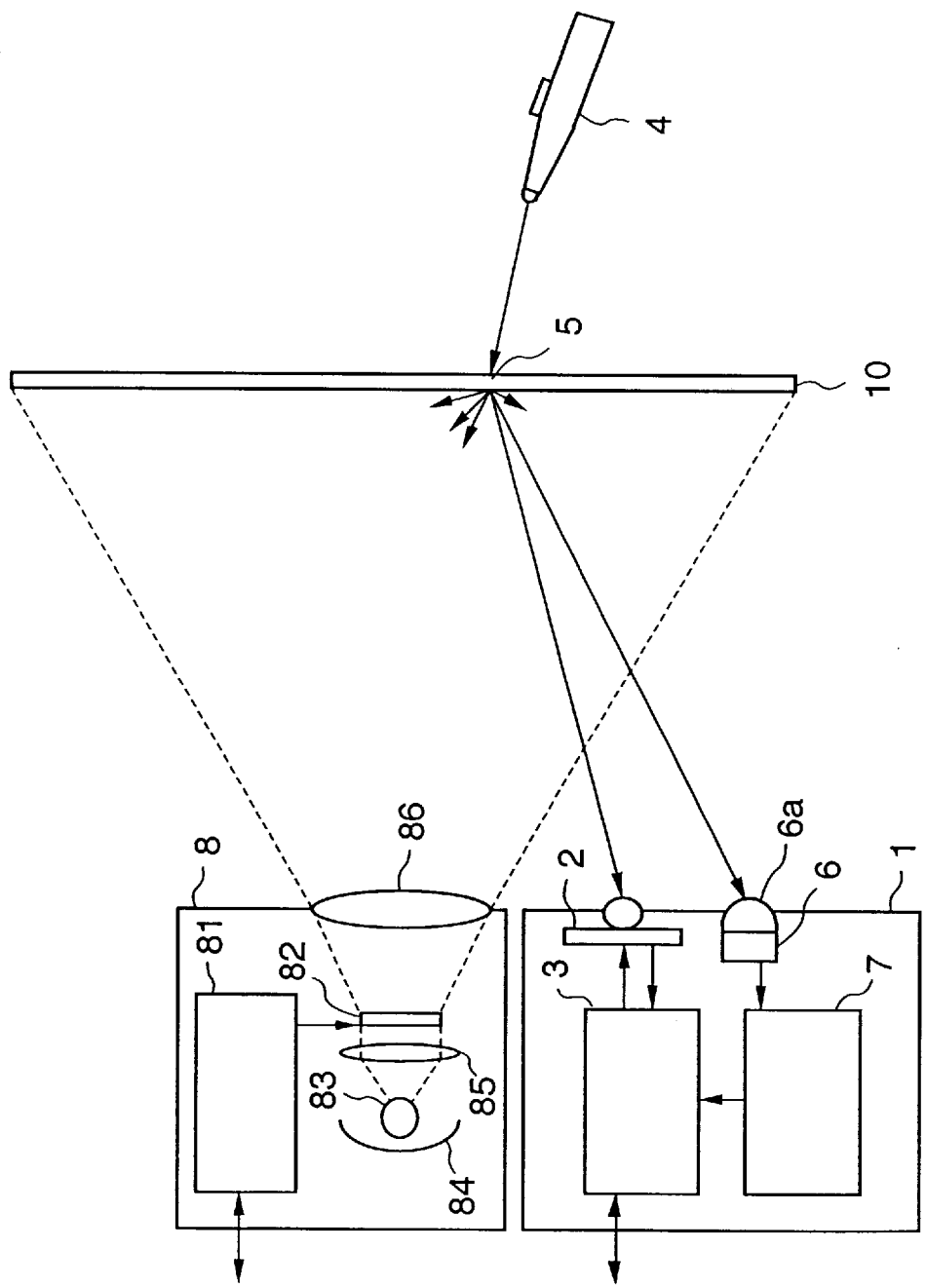
FIG. 1 is a view showing the schematic arrangement of a coordinate input apparatus according to the embodiment.

FIG. 1 is a view showing the schematic arrangement of a coordinate input apparatus according to the embodiment.

This coordinate input apparatus roughly comprises a pointing device 4 for forming a light spot 5 on a screen 10 as a coordinate input surface, and a coordinate detector 1 for detecting the coordinate values and the like of the light spot 5 on the screen 10. FIG. 1 also shows a projection display device 8 serving as an output device for displaying an image, coordinate values, and the like on the screen 10.

The coordinate detector 1 comprises a coordinate detection sensor section 2, a controller 3 for controlling the coordinate calculation, a light-receiving element 6, and a signal processing section 7. The coordinate detector 1 detects the coordinate position of the light spot 5 on the screen 10 and a control signal corresponding to the state of each switch (to be described later) of the pointing device 4 and causes the controller 3 to send the information to an externally connected device (not shown).

The projection display device 8 comprises an image signal processing section 81 for receiving an image signal from a display signal source, i.e., an externally connected device such as a host computer (not shown), an illumination optical system including a liquid crystal panel 82, lamp 83, mirror 84, and condenser lens 85 that are controlled by the image signal processing section 81, and a projecting lens 86 for projecting the image on the liquid crystal panel 82 to the screen 10, and can display desired image information on the screen 10. The screen 10 has appropriate light diffusion properties to widen the observation range of a projected image. Hence, a light beam emitted from the pointing device 4 is also diffused at the position of the light spot 5 such that the light diffused at the position of the light spot 5 partially enters the coordinate detector 1 independently of the position on the screen or the direction of light beam.

With this arrangement, when character information or line drawing information is input on the screen 10 using the pointing device 4, and the information is displayed by the projection display device 8, the information can be input/output as if the pointing device and screen were "a pencil and paper". Additionally, input operation such as button operation or icon selection/determination can be freely executed.

Detailed Description of Pointing Device 4

Figure 2:
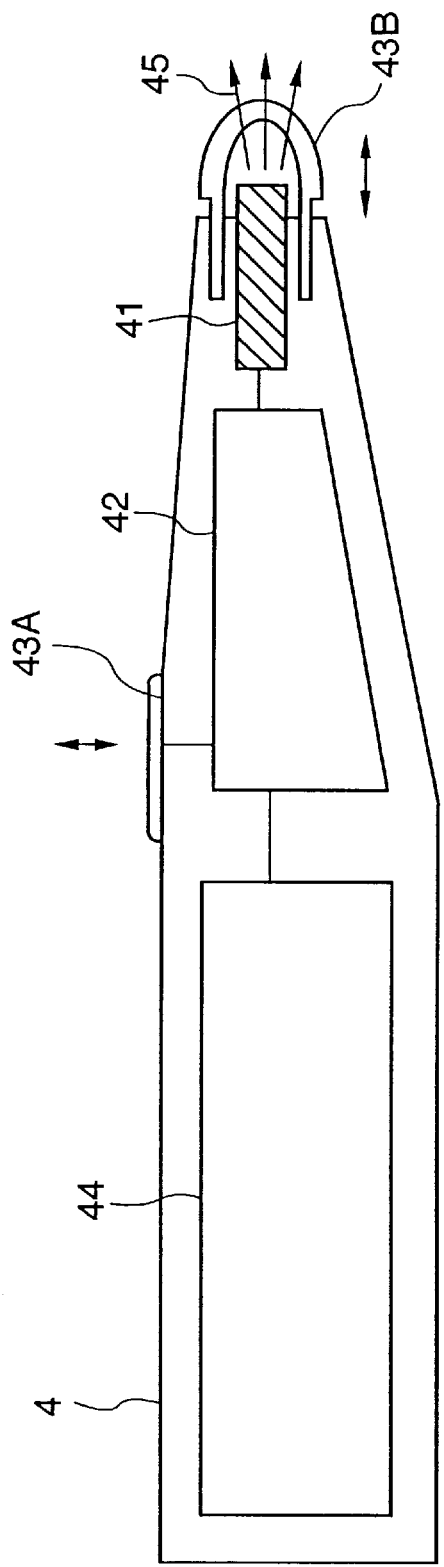
FIG. 2 is a view showing the detailed arrangement of a pointing device according to the embodiment.

FIG. 2 is a view showing the detailed arrangement of the pointing device according to the embodiment.

The pointing device 4 incorporates a light-emitting element 41 such as a semiconductor laser for emitting a light beam or an LED for emitting infrared light, a light emission control section 42 for driving and controlling the light emission, switches 43A and 43B, and a power supply section 44 such as a battery. The light emission control section 42 executes light emission control with control signals superposed in accordance with the states of the switches 43A and 43B by on/off-controlling light emission and using a modulation method (to be described later).

The operator grips the pointing device 4 and directs its tip to the screen 10. When the operator presses the switch 43A or presses the switch 43B against the screen 10, infrared light 45 is emitted. Then, the light spot 5 is formed on the screen 10, and output of a coordinate signal is started by predetermined processing.

The infrared light 45 contains the presence/absence of modulation, encoded switch information and pen ID information. The coordinate detector 1 reads these pieces of information, and the control section 3 transmits the coordinate values, switch information, and pen information to the host computer.

Upon receiving, e.g., switch information representing the ON state of the switch 43B, the host computer determines the state as "pen down" and performs the same operation as the left button operation of a mouse used in a DOS/V machine. When a drawing program is running, a line and the like can be drawn in this state. In addition, the switch 43A can be used as the right button of the mouse used in the DOS/V machine.

When one of the switches 43A and 43B is temporarily turned on, the light-emitting element 41 starts emitting light. Even when the switch is turned off, the light-emitting element 41 continues to emit light for a predetermined time. In this state, only the cursor on the screen moves. Hence, the operator can smoothly operate the pointing device by quickly and accurately drawing characters or a graphic pattern or selecting a button or menu item by one hand at an arbitrary position on the screen 10.

The light emission time is determined in consideration of the service life of the battery. For example, a light emission time of several tens of seconds can offer sufficient operability.

In this embodiment, switch information is superposed on the infrared light by two methods. Especially, the switch information of the switch 43B is relatively frequently updated and therefore expressed by the presence/absence of infrared light modulation.

The timing chart of infrared light emitted by the switch 43B will be described next with reference to FIG. 3.

Figure 3:
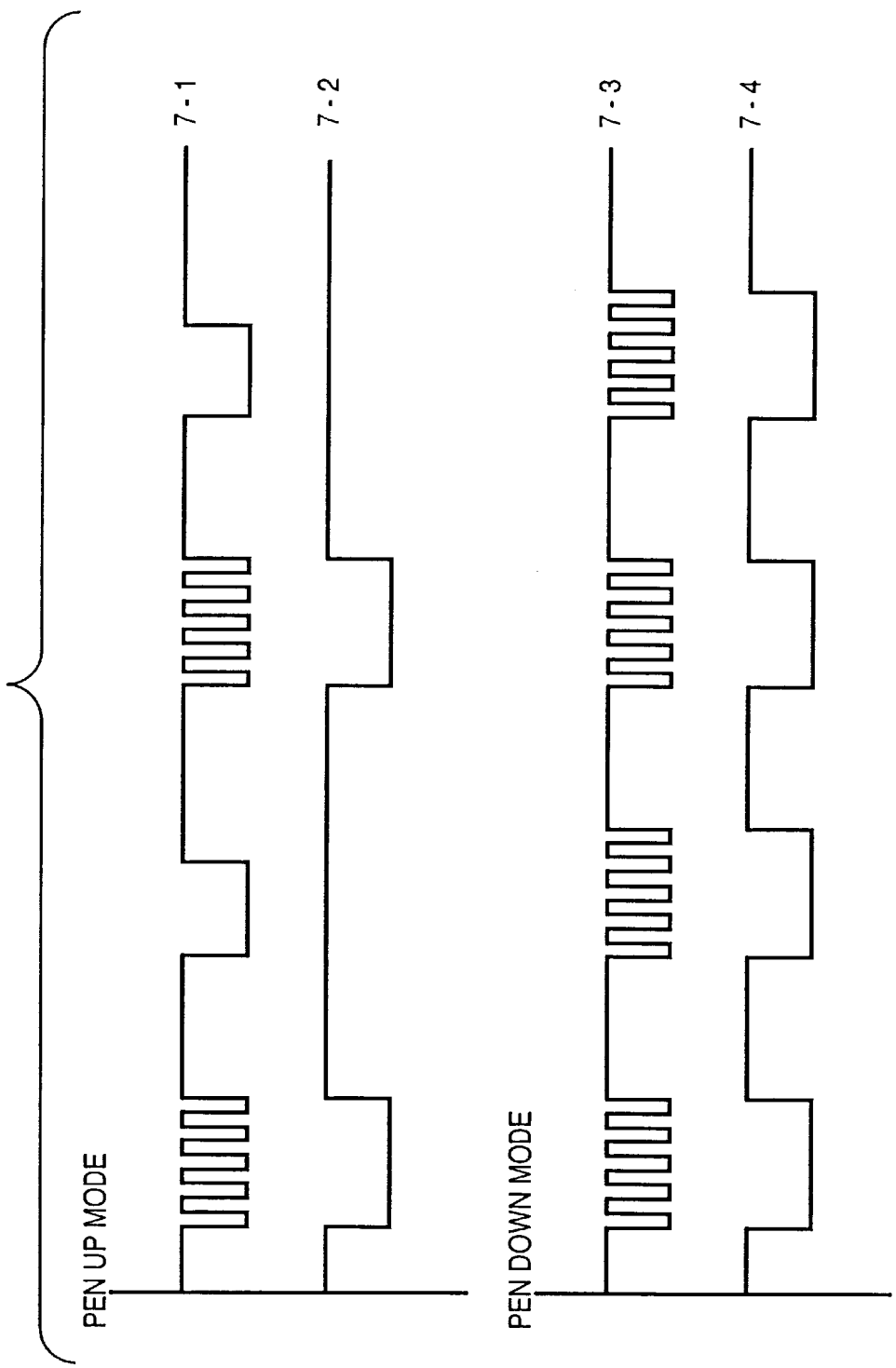
FIG. 3 is a timing chart of infrared light emitted by a switch 43B of the embodiment.

FIG. 3 is a timing chart of infrared light emitted by the switch 43B of the embodiment.

In the pen up mode of the switch 43B, modulated light and unmodulated light are alternately emitted, as indicated by 7-1 in FIG. 3. In the pen down mode of the switch 43B, modulated light is always emitted, as indicated by 7-3.

In the coordinate detector 1, the light-receiving element 6 detects the modulated light, and a frequency detection section (to be described later) extracts only the modulated light. The pen down state is determined when the extracted modulated light continues for a predetermined time, as indicated by 7-4. On the other hand, the pen up state is determined when the extracted modulated light is intermittent, as indicated by 7-2.

The timing chart of infrared light emitted by the switch 43A will be described next with reference to FIG. 4.

Figure 4:
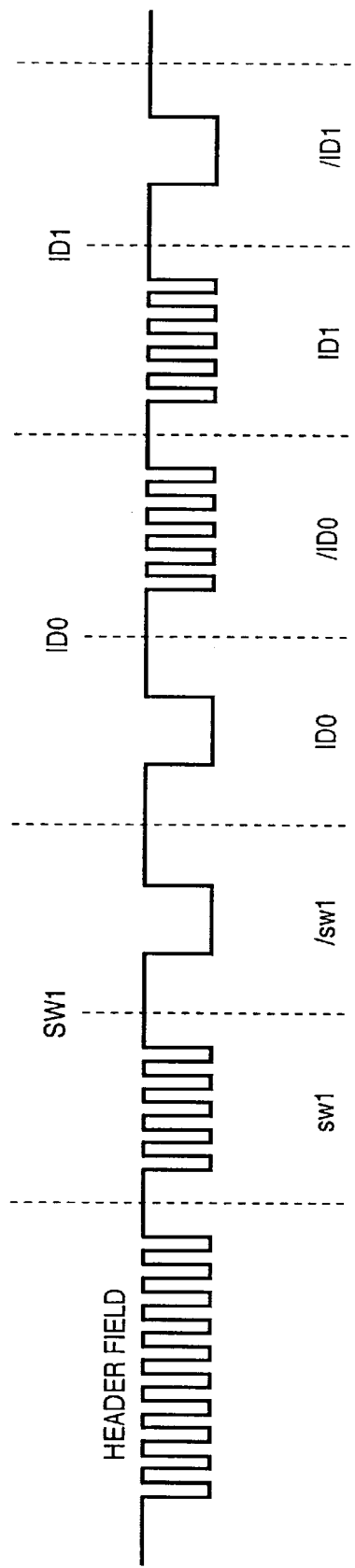
FIG. 4 is a timing chart of infrared light emitted by a switch 43A of the embodiment.

FIG. 4 is a timing chart of infrared light emitted by the switch 43A of the embodiment.

The switch information and pen ID information contained in infrared light emitted by the switch 43A are detected by the coordinate detector 1 by another method. A header field is prepared in the infrared light, and if the header field is detected, the ON/OFF state of the switch 43 and the pen ID information are determined on the basis of the pattern of modulated light following the header field. For this determination as well, "0" and "1" states are expressed by the above-described presence and absence of light modulation.

Since the information of each state and its inverted information, e.g., /SW1 and SW1 are transmitted paired, any determination error can be prevented.

In this embodiment, only two switches are arranged. However, the present invention is not limited to this, and more switches may be prepared. The function of each switch can be re-defined by, e.g., the driver on the host computer side so that functions suitable for the user's use form can be selected.

Detailed Description of Coordinate Detector 1

Figure 5:
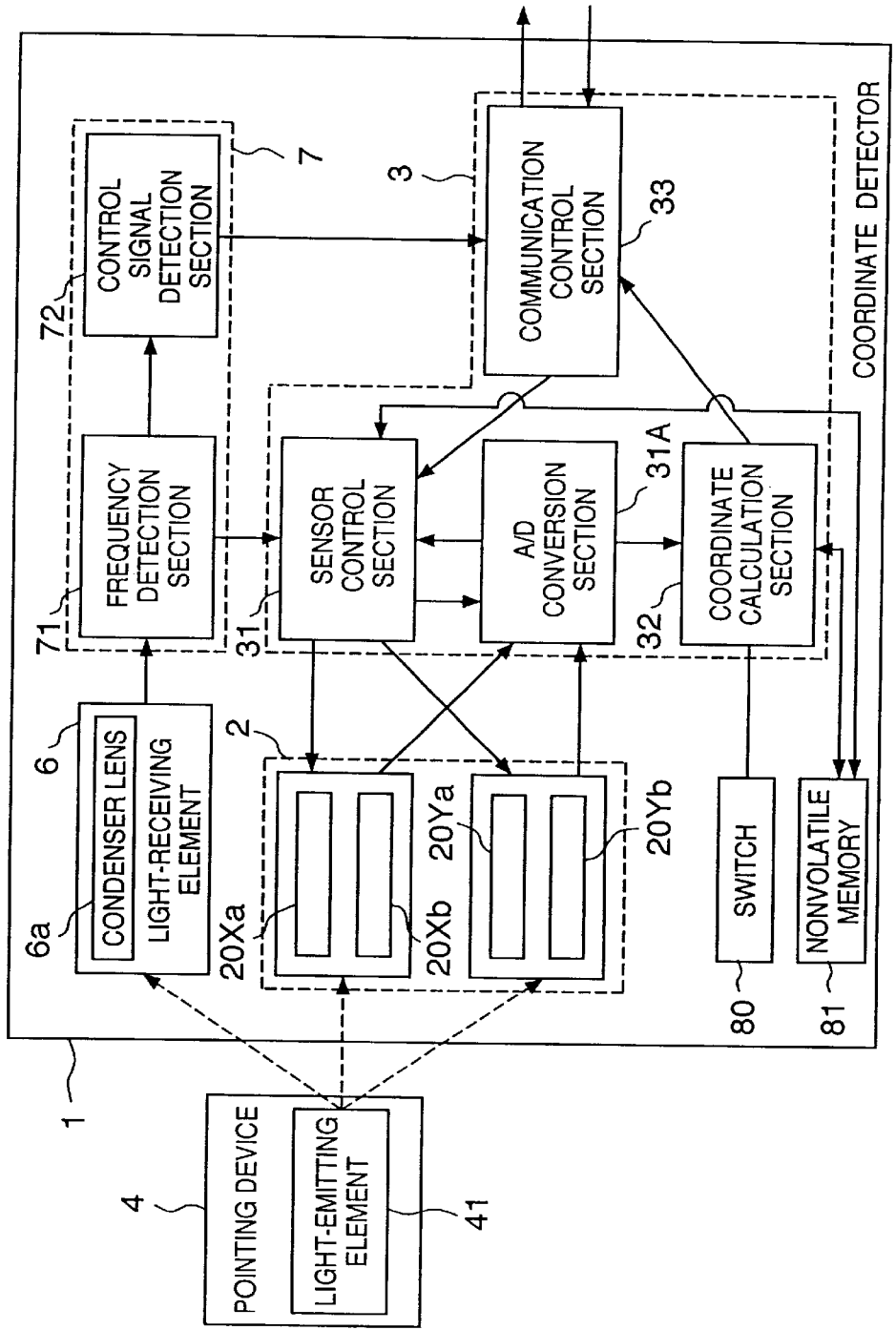
FIG. 5 is a block diagram showing the detailed arrangement of a coordinate detector according to the embodiment.

FIG. 5 is a block diagram showing the detailed arrangement of the coordinate detector according to the embodiment.

The coordinate detector 1 has the light-receiving element 6 for sensitively detecting the light amount by a condenser optical system, and four linear sensors 20Xa, 20Xb, 20Ya, and 20Yb for detecting the direction of arrival of light by an imaging optical system. The linear sensors 20Xa, 20Xb, 20Ya, and 20Yb receive diffused light from the light spot 5 formed on the screen 10 by the light beam from the light-emitting element 41 incorporated in the pointing device 4.

Description of Operation of Condenser Optical System

The light-receiving element 6 has a condenser lens 6a serving as a condenser optical system to detect the amount of light having a predetermined wavelength at a high sensitivity from the full range of the screen 10. The detection output is detected by a frequency detection section 71 and demodulated into a digital signal containing data such as a control signal (signal superposed by the light emission control section 42 of the pointing device 4) by a control signal detection section 72.

In this embodiment, since no means such as a code for transmitting a timing signal is used, the linear sensors 20Xa, 20Xb, 20Ya, and 20Yb are controlled by a modulated signal. The signal is detected by the difference between the ON mode and the OFF mode, as will be described later. To synchronize the shutter timing and light emission timing, a reset signal for the linear sensors 20Xa, 20Xb, 20Ya, and 20Yb is generated using the timing of the modulated signal.

The timing charts handled by the frequency detection section 71 will be described with reference to FIG. 6.

Figure 6:
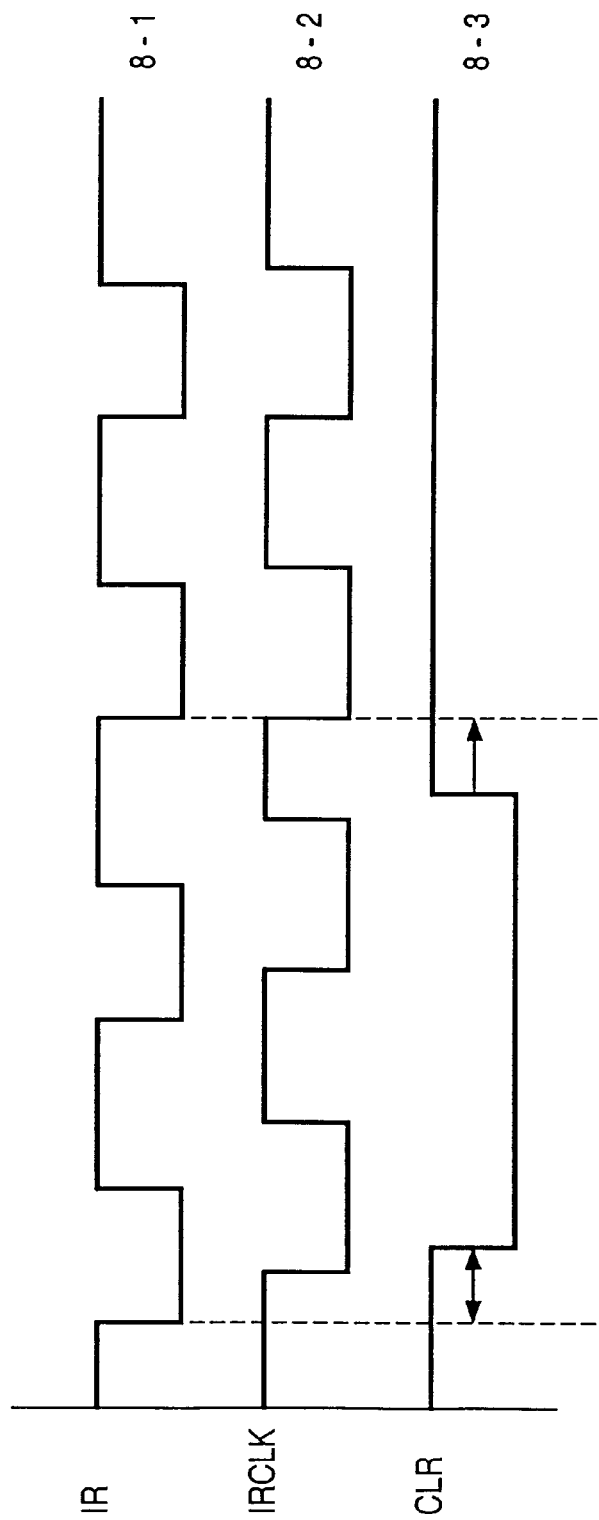
FIG. 6 is a timing chart showing signals handled in the embodiment.

FIG. 6 is a timing chart showing signals handled in this embodiment.

Figure 8:
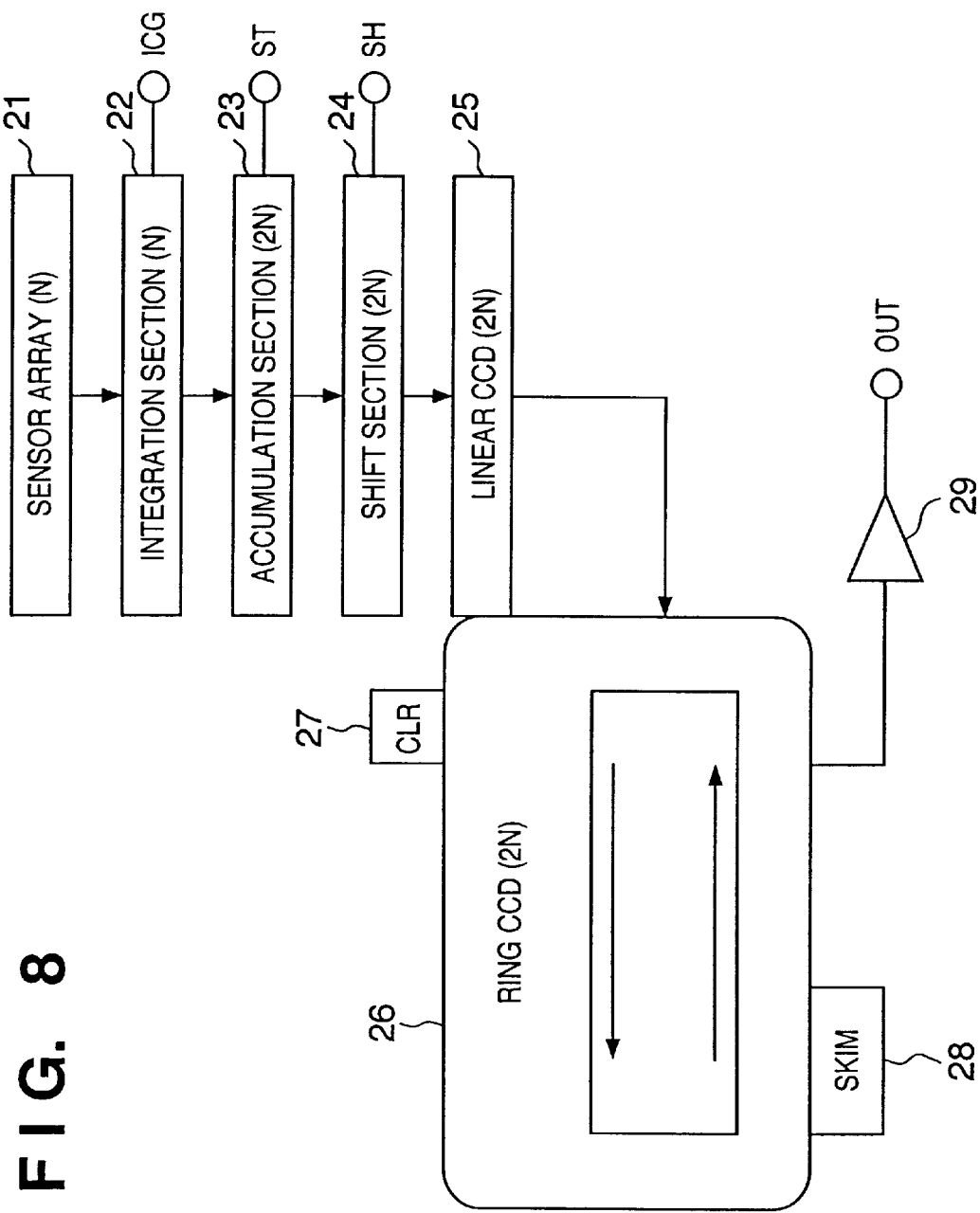
FIG. 8 is a view showing the detailed structure of the linear sensor according to the embodiment.

Referring to FIG. 6, 8-1 represents a signal IR after the modulated signal in the pen down state is detected by the frequency detection section 71. Since the signal IR represents a so-called light emission period, the shutter timing of the linear sensors 20Xa, 20Xb, 20Ya, and 20Yb must be synchronized with this signal.

On the other hand, 8-2 represents a signal IRCLK representing the shutter cycle of the linear sensors 20Xa, 20Xb, 20Ya, and 20Yb, i.e., a timing for executing detection in the ON state at L (low level) and detection in the OFF state at H (high level). The signal IRCLK is output from the linear sensors 20Xa, 20Xb, 20Ya, and 20Yb in accordance with a clock supplied to the linear sensors 20Xa, 20Xb, 20Ya, and 20Yb. To synchronize the signal IRCLK with the light emission period, when the signal IR represented by 8-1 is detected, a clear (CLR) signal is output to the linear sensors 20Xa, 20Xb, 20Ya, and 20Yb represented by 8-3 after a predetermined delay time with which the signal IR and signal IRCLK synchronize each other.

This clear operation enables synchronization. The delay amount is determined depending on the time until the signal IRCLK goes low after the CLR signal is ended.

Description of Operation of Imaging Optical System

Figure 7:
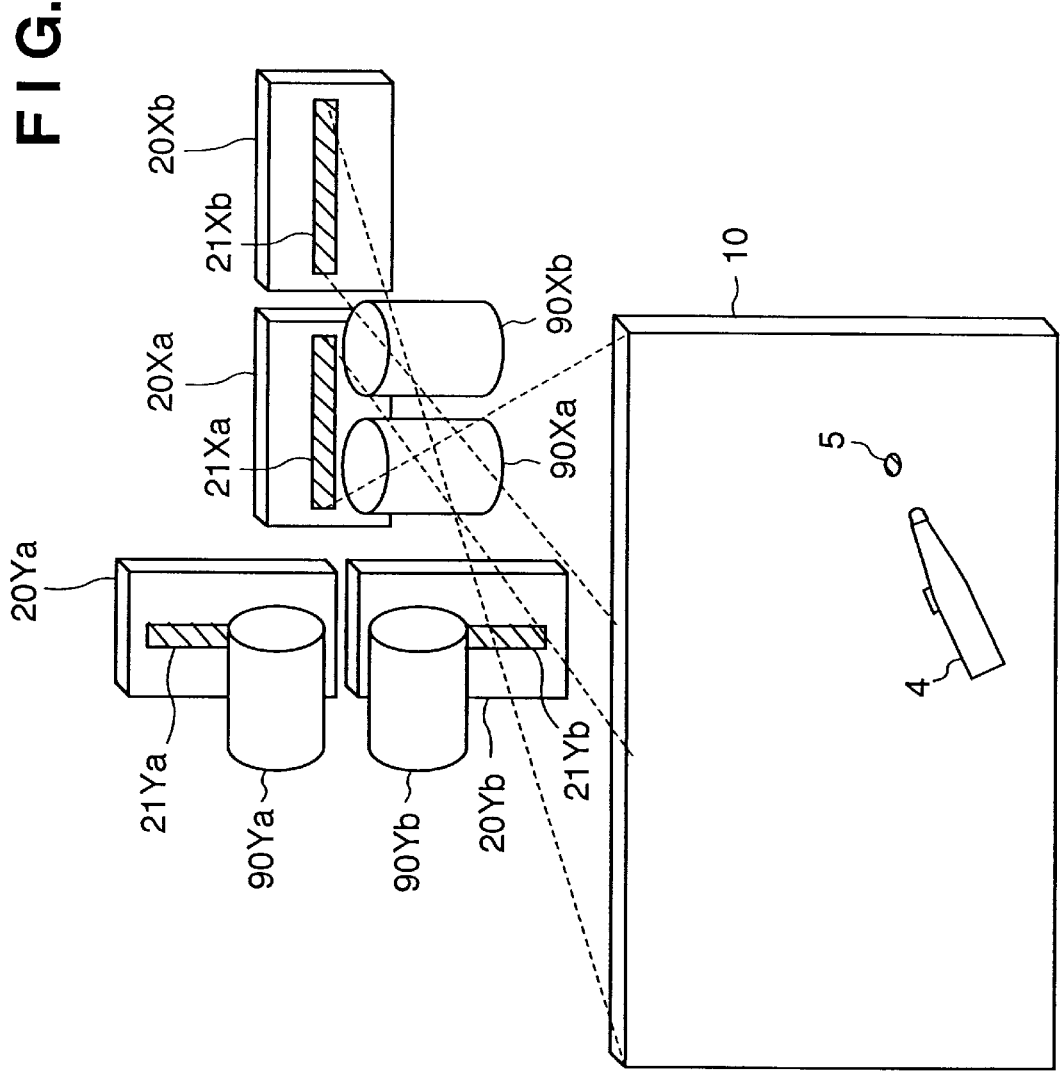
FIG. 7 is a view showing the layout relationship between linear sensors 20Xa, 20Xb, 20Ya, and 20Yb.

FIG. 7 is a view showing the layout relationship between the linear sensors 20Xa, 20Xb, 20Ya, and 20Yb.

Referring to FIG. 7, the light spot 5 forms linear images on photosensitive portions 21Xa, 21Xb, 21Ya, and 21Yb of the linear sensors 20Xa, 20Xb, 20Ya, and 20Yb through cylindrical lenses 90Xa, 90Xb, 90Ya, and 90Yb serving as an imaging optical system. When the linear sensors 20Xa, 20Xb, 20Ya, and 20Yb are accurately laid out perpendicularly to each other, each linear sensor can obtain an output with a peak on a pixel that reflects the X- or Y-coordinate.

The linear sensors 20Xa, 20Xb, 20Ya, and 20Yb are controlled by a sensor control section 31. The output signals are converted into digital signals by an A/D conversion section 31A connected to the sensor control section 31 and sent to a coordinate calculation section 32. The coordinate calculation section 32 calculates the output coordinate values from the received digital signals and sends the calculation result to an external control unit (not shown) through a communication control section 33 together with data such as the control signal from the control signal detection section 72 using a predetermined communication method. To execute operation (e.g., user calibration value setting) different from the normal operation for adjustment, a mode switching signal is sent from the communication control section 33 to the sensor control section 31 and coordinate calculation section 32.

In the present invention, an image blur is intentionally generated by focus adjustment or using a diffusion film such that the image of the light spot 5 has a width several times larger than that of each pixel of the linear sensors 20Xa, 20Xb, 20Ya, and 20Yb. If the blur is too large, the peak level becomes low. Hence, an image width corresponding to several pixels is most preferable. As a characteristic feature of the present invention, the linear sensors 20Xa, 20Xb, 20Ya, and 20Yb each having a CCD with a small number of pixels and an optical system with an appropriate blur are used. With this combination, an inexpensive, high-speed coordinate input apparatus which has a high resolving power and accuracy and a small arithmetic data amount can be implemented using a small sensor and optical system.

The linear sensors 20Xa and 20Xb for detecting the X-coordinate and the linear sensors 20Ya and 20Yb for detecting the Y-coordinate, that are laid out in an array, have the same structure. The detailed structure will be described with reference to FIG. 8.

FIG. 8 is a view showing the detailed structure of the linear sensor according to the embodiment.

A sensor array 21 serving as a light-receiving section is formed from N pixels (64 pixels in this embodiment). Charges corresponding to the light-receiving amount are accumulated in an integration section 22. The integration section 22 has N elements. The integration section 22 can be reset by applying a voltage to a gate PCG and therefore can execute electronic shutter operation. The charges accumulated in the integration section 22 are transferred to an accumulation section 23 by applying a pulse voltage to an electrode ST. The accumulation section 23 has 2N elements which independently accumulate charges in correspondence with H (high level) and L (low level) of the IRCLK signal synchronized with the light emission timing of the pointing device 4. The charges independently accumulated in synchronism with blink of light are transferred to a linear CCD section 25 with 2N through a shift section 24 having 2N elements and arranged to simplify the transfer clock.

With this operation, the linear CCD section 25 stores an array of charges corresponding to blink of light as sensor outputs from the N pixels. The charges stored in the linear CCD section 25 are sequentially transferred to a ring CCD section 26 having 2N elements. The ring CCD 26 is cleared by a CLR section 27 in accordance with a CLR signal and then sequentially accumulates charges from the linear CCD section 25.

The thus accumulated charges are read out by an amplifier 29. The amplifier 29 nondestructively outputs a voltage proportional to the accumulated charge amount. Actually, the amplifier 29 amplifies and outputs the difference between adjacent charge amounts, i.e., a value obtained by subtracting the charge amount in the OFF state of the light-emitting element 41 from the charge amount in the ON state.

Resultant output waveforms from the linear sensors 20Xa, 20Xb, 20Ya, and 20Yb will be described with reference to FIG. 9.

Figure 9:
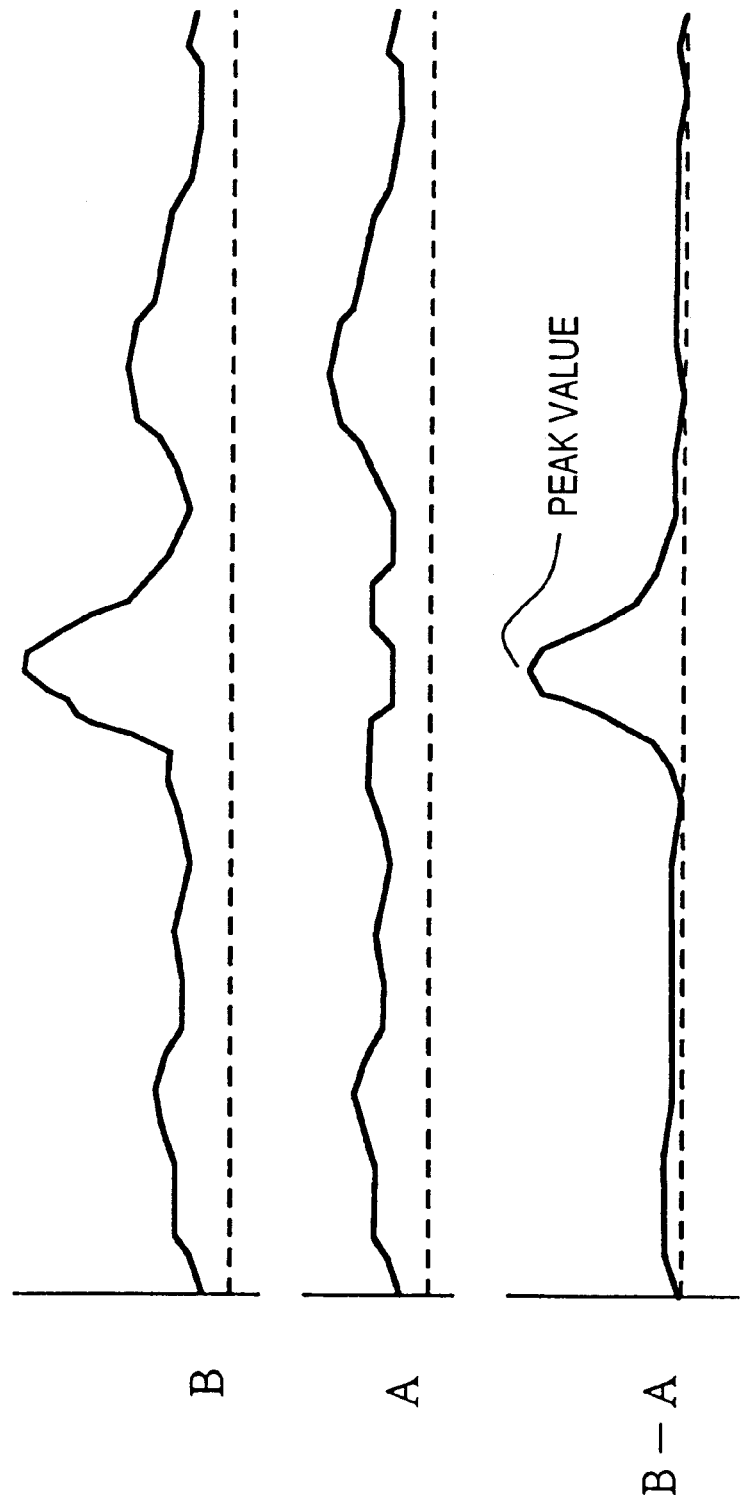
FIG. 9 is a waveform chart showing output waveforms of the linear sensors according to the embodiment.

FIG. 9 is a waveform chart showing output waveforms of the linear sensors according to the embodiment.

Referring to FIG. 9, a waveform B is obtained by reading only signals in the ON state of the light-emitting element 41. A waveform A is obtained when the light-emitting element 41 is OFF, i.e., when only disturbance light is input (as shown in FIG. 8, charges of pixels corresponding to the waveforms A and B are adjacently stored in the ring CCD 26). The amplifier 29 nondestructively amplifies and outputs the difference value (waveform B-A) between the adjacent charge amounts. With this operation, a signal corresponding to only the image of light from the pointing device 4 can be obtained, and coordinates can be stably input without any influence of disturbance light (noise).

The maximum value of the waveform B-A shown in FIG. 9 is defined as a PEAK value. When the accumulation time during which the linear sensors 20Xa, 20Xb, 20Ya, and 20Yb function for light is increased, the PEAK value increases in accordance with the time. In other words, when the time corresponding to one period of the IRCLK signal is defined as a unit accumulation time, and the number n of times of accumulation is defined using that time as a unit, the PEAK value increases as the number n of times of accumulation increases. By detecting that the PEAK value reaches a predetermined magnitude TH1, an output waveform with a predetermined quality can always be obtained.

Figure 10:
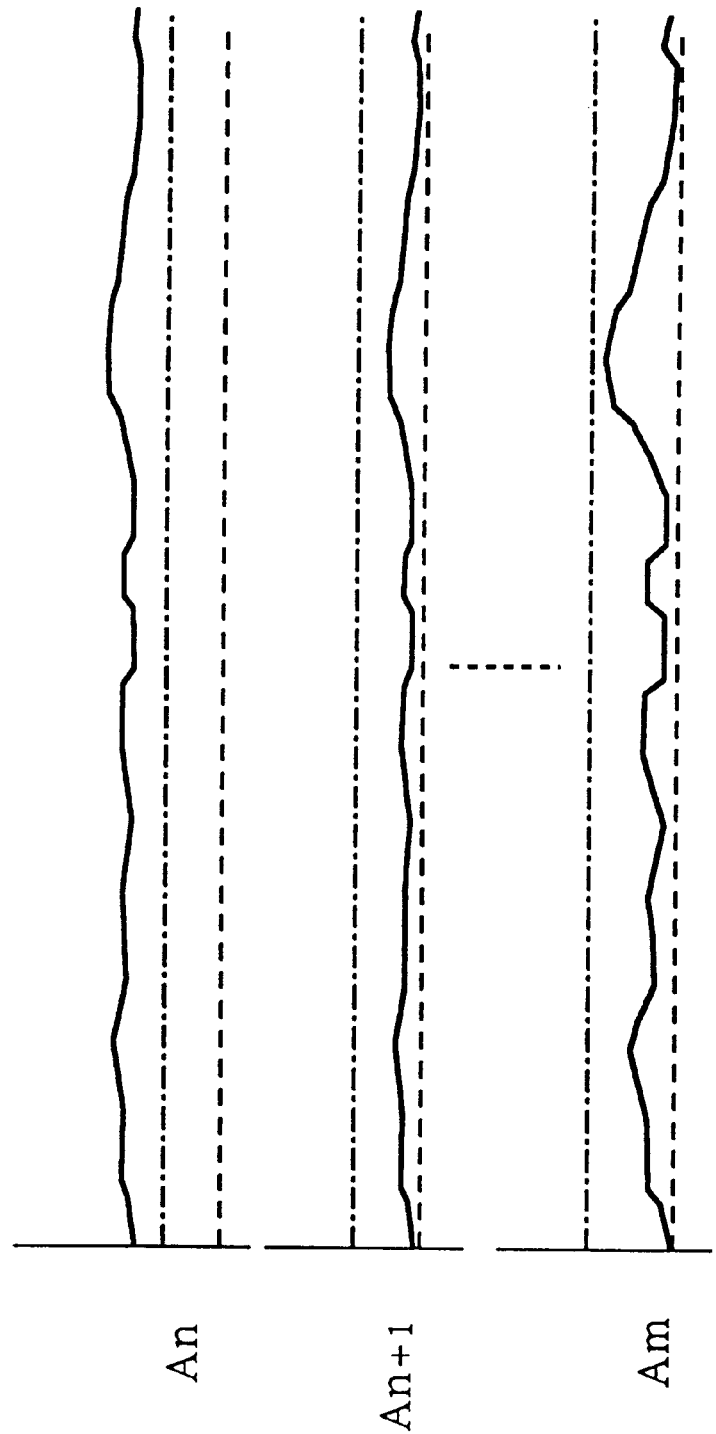
FIG. 10 is a waveform chart showing output waveforms so as to explain the skim operation of the linear sensor according to the embodiment.

If disturbance light is very strong, the transferred charges in the ring CCD 26 may saturate before the peak of the difference waveform B-A obtains a sufficient magnitude. In consideration of such a case, each of the linear sensors 20Xa, 20Xb, 20Ya, and 20Yb has a SKIM section 28 having a skim function. The SKIM section 28 monitors the level of the OFF signal. When the signal level is more than a predetermined value for An of nth time in FIG. 10 (alternate long and short dashed line in FIG. 10), the SKIM section 28 removes charges in a predetermined amount from each pixel of A and B. With this operation, a waveform represented by An+1 is obtained for the next (n+1)th time. Even when disturbance light is very strong, signal charges can be continuously accumulated without being saturated by repeating the above operation.

Hence, even when the amount of blinking light from the pointing device 4 is small, a signal waveform having a sufficient magnitude can be obtained by repeating the integration operation a number of times. Especially, when a light source in a visible light range is used for the pointing device 4, the signal of the display image is superposed on the light emission signal, and in this case, a sharp waveform free from noise can be obtained using the above-described skim function and difference output.

The timing chart of output control for the ring CCD 26 will be described next with reference to FIG. 11.

Figure 11:
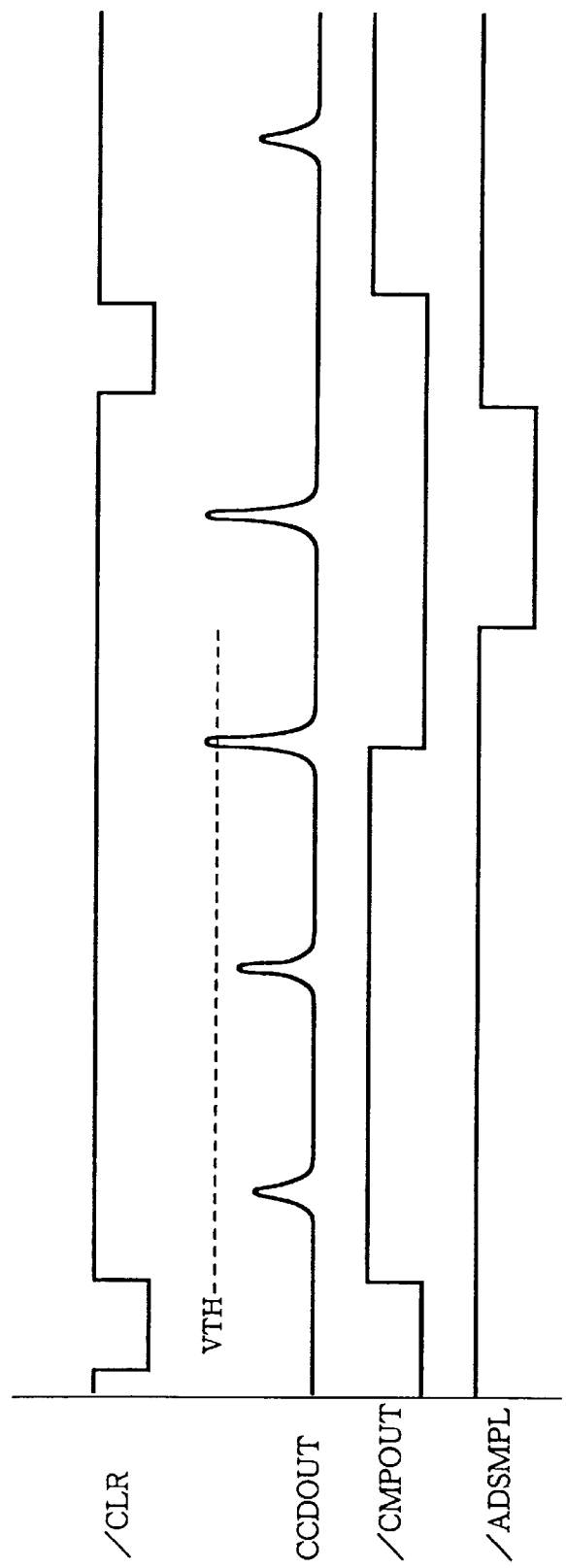
FIG. 11 is a timing chart of ring CCD output control according to the embodiment.

FIG. 11 is a timing chart of ring CCD output control according to the embodiment.

First, all operations are cleared by the CLR signal after a predetermined delay time for the signal IR. After that, when input from the pointing device 4 is detected, a detection signal such as a signal CCDOUT becomes large in accordance with integration operation. When the signal level exceeds a predetermined level (VTH), a CMPOUT signal output from the comparator falls to stop the integration operation of the ring CCD 26. When the CMPOUT signal falls, the sensor control section 31 starts A/D conversion. The A/D conversion is performed for all pixel outputs of the ring CCD 26, as indicated by an ADSMPL signal.

As described above, when the output from the ring CCD 26 does not exceed the predetermined level, the sensor control section 31 counts the time elapsed from the clear timing, and when the time exceeds a predetermined time, forcibly executes the A/D conversion operation. With this arrangement, even when the input is small, sampling is always executed within a predetermined sampling time.

Figure 12:
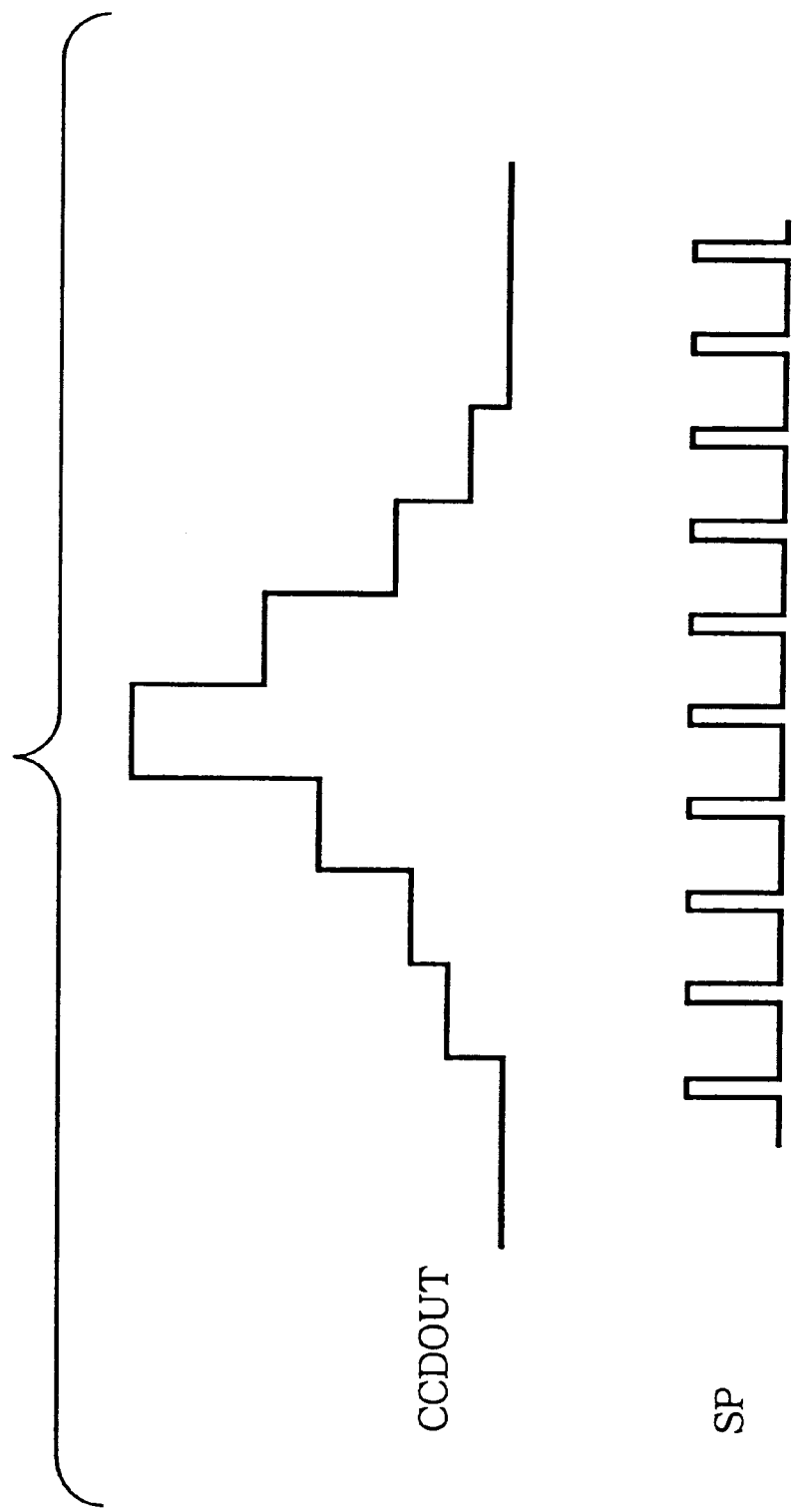
FIG. 12 is a timing chart of A/D conversion according to the embodiment.

A/D conversion is executed at the timing shown in FIG. 12. That is, when the time axis is enlarged, the CCDOUT signal as the output from the ring CCD 26 is output as a voltage corresponding to the detection light level for each pixel, as shown in FIG. 12. This signal is A/D-converted for each pixel at the timing of a sampling pulse SP, and the sensor control section 31 stores that level in a nonvolatile memory 81.

The above operation is performed for all elements of the ring CCD 26 corresponding to all coordinate axes, and coordinate calculation to be described later is executed.

Light from the pointing device 4 to the coordinate detector varies in accordance with the consumption level of the power supply section (battery) 44 incorporated in the pointing device 4 and also varies depending on the posture of the pointing device 4. Especially, when the light diffusion of the screen 10 is small, the front luminance of a display image improves, though the variation in input light amount to the coordinate detector 1 due to the posture of the pointing device 4 becomes large. In the present invention, even in such a case, since the number of times of integration automatically follows up to always obtain a stable output signal, the coordinates can be stably detected.

As described above, since a high-frequency carrier is added to the blinking light, and timing control of integration operation is done by a demodulated signal at a predetermined period which is obtained by frequency-detecting the carrier, a convenient coordinate input apparatus capable of synchronizing the pointing device and image carrier section without using any wire can be implemented. In addition, since an integration control means for stopping the integration operation in accordance with the peak level in the difference signal from the integration section is arranged, a light spot image signal of almost predetermined level can be generated even when the light amount changes, and a stable high-resolution coordinate calculation result can always be obtained.

Coordinate Value Calculation

Coordinate calculation processing by the coordinate calculation section 32 will be described.

The output signal from the four linear sensors 20Xa, 20Xb, 20Ya, and 20Yb obtained by the above-described method (difference signal from the amplifier 29) is converted into a digital signal by the A/D conversion section 31A in the sensor control section 31 and sent to the coordinate calculation section 32 to calculate the coordinate values. First, the coordinate values are obtained for the X- and Y-coordinate outputs in the respective directions. The calculation processing is common to the X- and Y-coordinates, and only calculation of the X-coordinate value will be described.

Figure 13:
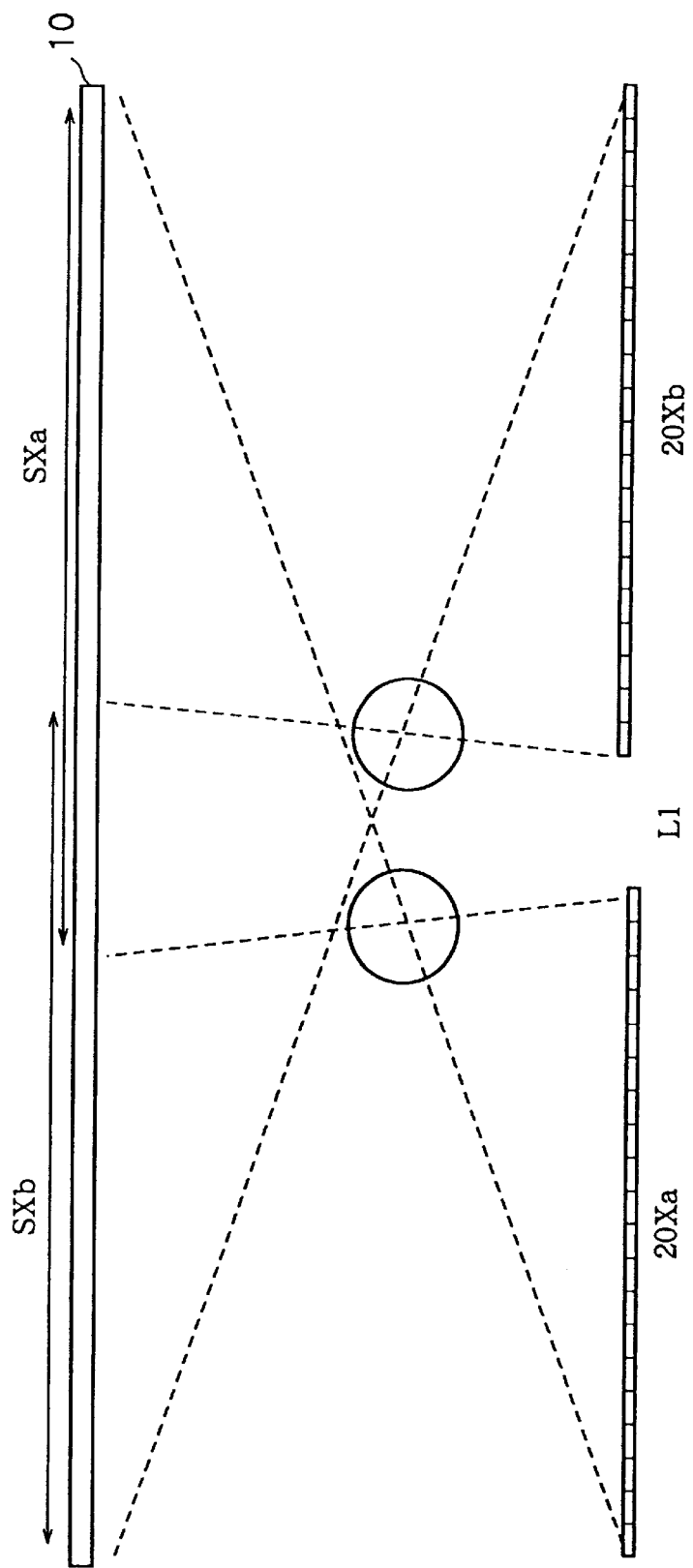
FIG. 13 is a view showing the structure of the linear sensors according to the embodiment.

As shown in FIG. 13, the linear sensors 20Xa and 20Xb are constructed as half detection regions in the vertical direction of the screen 10. The detection regions overlap near the center.

When the light spot is in a region SXa of the screen 10, the linear sensor 20Xa detects the light. When the light spot is in a region SXb of the screen 10, the linear sensor 20Xb detects the light. In the overlap region, both sensors detect the light. The outputs from the linear sensors 20Xa and 20Xb at that time will be described with reference to FIG. 14.

Figure 14:
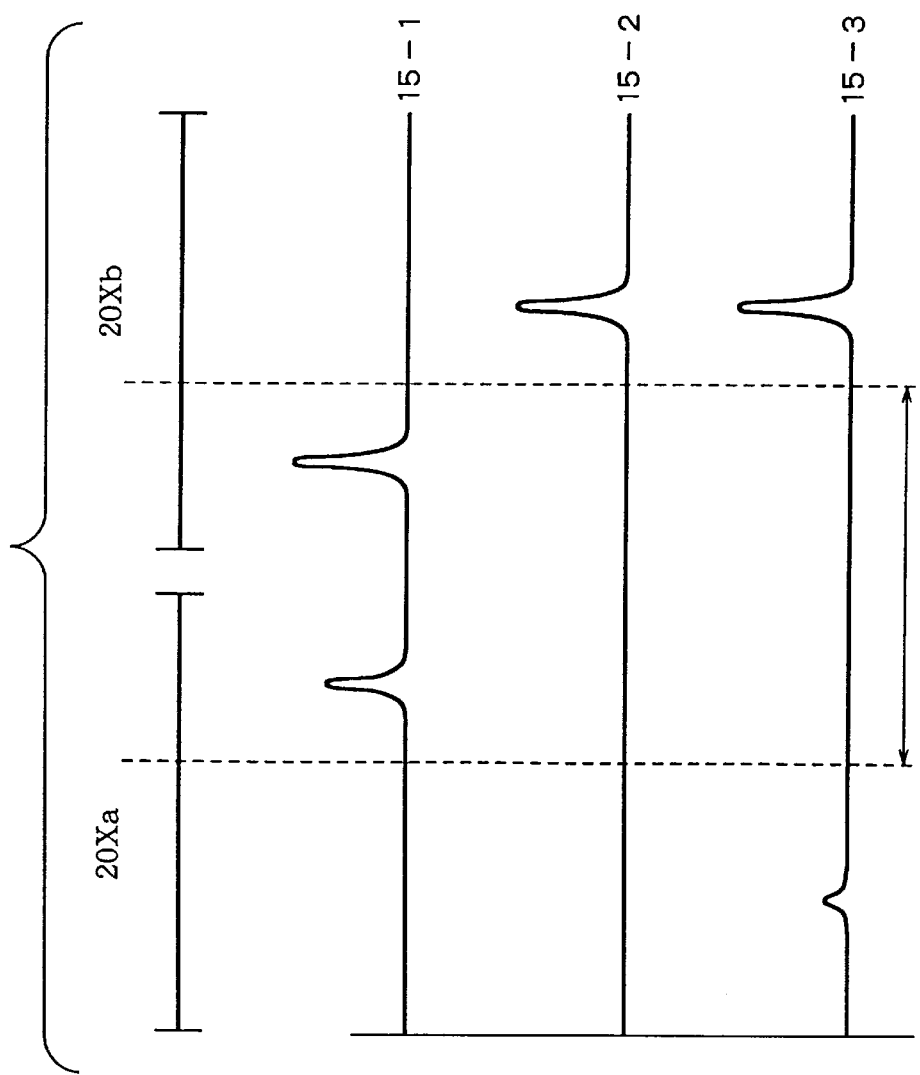
FIG. 14 is a view schematically showing the outputs of the linear sensors according to the embodiment.

FIG. 14 is a view schematically showing the outputs of the linear sensors.

When the light spot is in the overlap portion at the center, both the linear sensors 20Xa and 20Xb output signals, as indicated by 15-1. When the light spot is in the region SXb, only the linear sensor 20Xb outputs a signal, as indicated by 15-2. Ideally, except the overlap portion, when one of the linear sensors outputs a signal, switching determination is done depending on whether the coordinate values from one linear sensor exceeds a reference point, and the coordinate values are connected.

However, an output is sometimes detected at a portion other than the actual light spot portion due to noise, leakage light, or disturbance light, as indicated by 15-3.

In this case, if determination is done on the basis of coordinate values from one linear sensor, a determination error occurs, and the cursor or the like is suddenly displayed at a wrong point on the display screen. During, e.g., drawing, an unnecessary line is drawn. To prevent this problem, in the present invention, the coordinate values are determined on the basis of the peak value of the obtained outputs from the linear sensors 20Xa, 20Xb, 20Ya, and 20Yb.

The process flow of coordinate calculation processing according to the embodiment will be described next with reference to FIG. 15.

Figure 15:
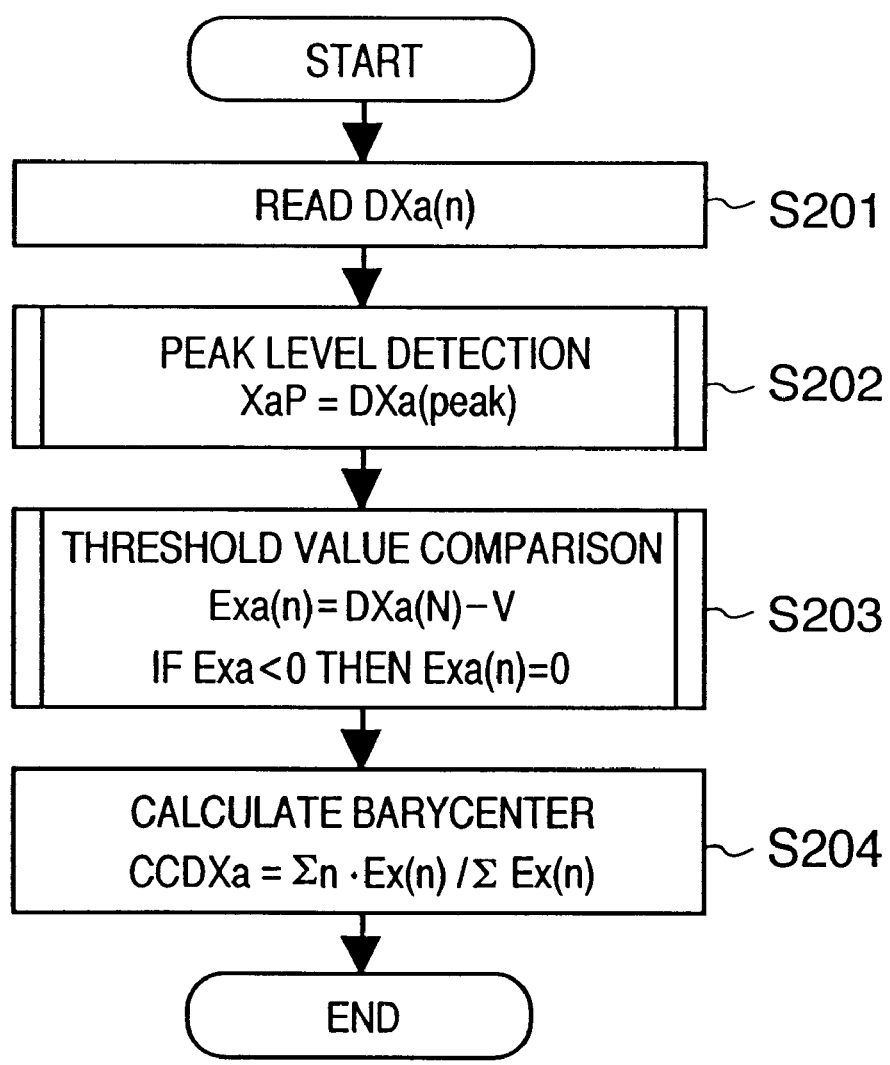
FIG. 15 is a flow chart showing the process flow of coordinate calculation processing according to the embodiment.

FIG. 15 is a flow chart showing the process flow of coordinate calculation processing according to the embodiment.

Outputs from the ring CCDs 26 of the linear sensors 20Xa and 20Xb are defined as DXa and DXb. Each of the values is an A/D-converted value, as described above, i.e., a voltage value corresponding to the photodetection amount for each pixel of the ring CCD 26. The peak level can be determined by the maximum value of each data.

Coordinates detected by the linear sensors 20Xa and 20Xb are defined as CCDXa and CCDXb.

In step S201, difference data DXa (n) (the number n of pixels=64 in this embodiment) as the difference signal of each pixel at an arbitrary coordinate input point is read and stored in a buffer memory (not shown). In step S202, the peak level of this data is obtained and stored in the nonvolatile memory 81 as Xap. In step S203, the value is compared with a preset threshold value V, and a data value Exa(n) equal to or larger than the threshold value is calculated. In step S204, the coordinate CCDXa on the linear sensor 20Xa is calculated using the data value Exa(n). In this embodiment, the barycenter of the output data is calculated by the barycentric method. However, the calculation method is not limited to the above method, and a method of obtaining the peak value of the output data Exa(n) (by, e.g., the differential method) may also be used.

In a similar way, the coordinate CCDXb on the linear sensor 20Xb is also calculated.

These calculated coordinate values are coordinates corresponding to the pixels on the linear CCDs 26 of the linear sensors 20Xa and 20Xb. When these coordinate values are connected, they can be processed as coordinate values on one linear sensor 20Xa or 20Xb.

To do this, reference coordinates for connecting the coordinate values corresponding to the pixels on the linear CCDs 26 of the linear sensors 20Xa and 20Xb are defined.

The definition of the reference coordinates will be described with reference to FIG. 16.

Figure 16:
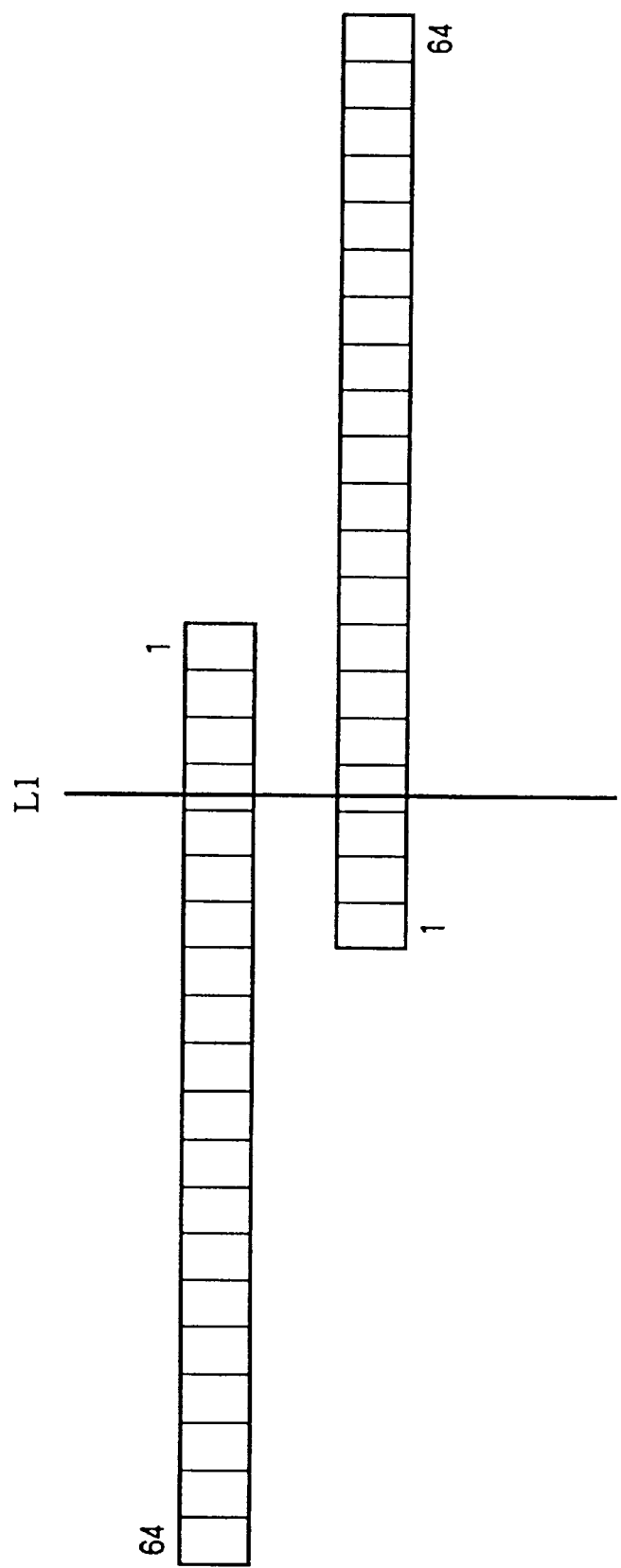
FIG. 16 is a view for explaining the definition of reference coordinates according to the embodiment.

FIG. 16 is a view for explaining the definition of reference coordinates according to the embodiment.

FIG. 16 shows a conceptual layout of the coordinates of the linear CCDs 26 of the linear sensors 20Xa and 20Xb. Since the detection regions of the linear sensors 20Xa and 20Xb have overlap portions, as described above, the coordinate positions overlap, as shown in FIG. 16.

At this time, reference points are defined in advance in a region where both the linear CCDs 26 of the linear sensors 20Xa and 20Xb can execute measurement. That is, a signal is input to the overlap portion on the screen 10, and the coordinates CCDXa and CCDXb (CCDXa_org, CCDXb_org) are read. These values are stored in the nonvolatile memory 81 such as an EEPROM as reference point data (reference coordinates). In normal use, the values are read out to calculate the coordinate values.

Processing of calculating a connected coordinate CCDX obtained by connecting the coordinate values corresponding to the pixels on the linear CCDs 26 of the linear sensors 20Xa and 20Xb using the reference point data will be described below with reference to FIG. 17.

Figure 17:
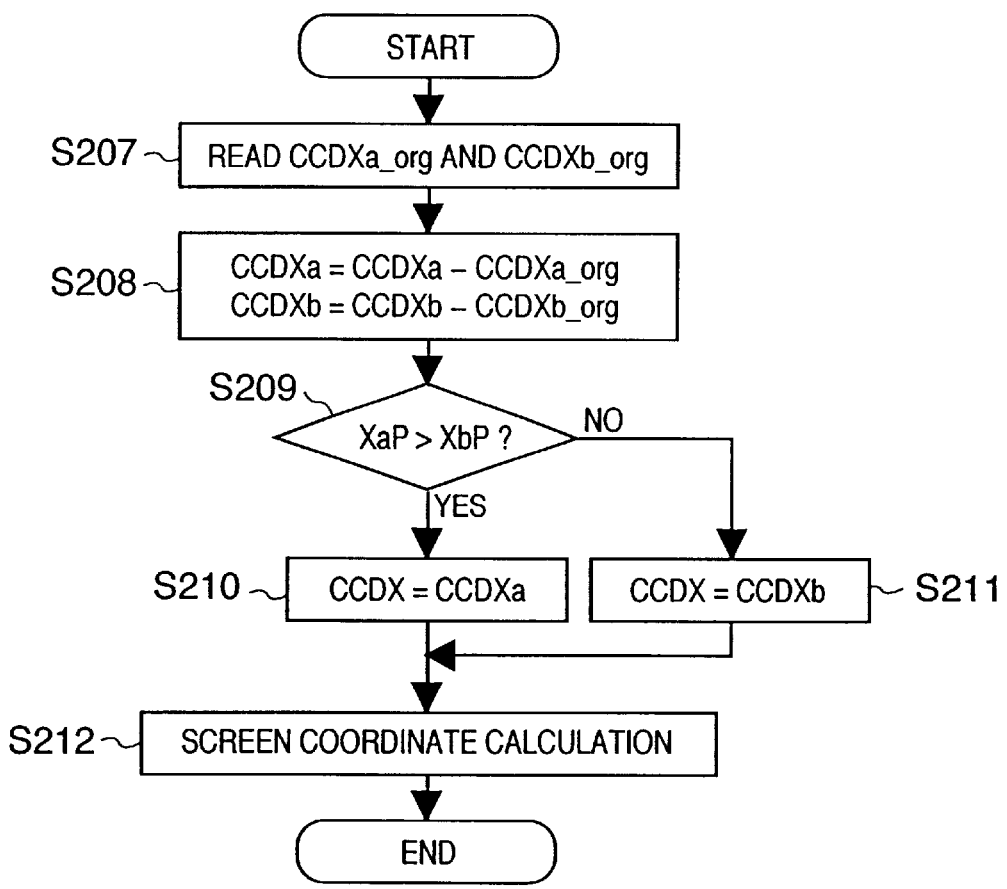
FIG. 17 is a flow chart showing the process flow of calculation processing of connected coordinates CCDX according to the embodiment.

FIG. 17 is a flow chart showing the process flow of calculation processing of the connected coordinate CCDX according to the embodiment.

In step S207, the reference point data (CCDXa_org, CCDXb_org) of the linear CCDs 26 of the linear sensors 20Xa and 20Xb are read out from the memory. In step S208, the difference between the reference point data and the values CCDXa and CCDXb calculated when input from the pointing device 4 is detected is calculated. The values are converted into coordinates on the linear CCDs whose origins are set at points on a line L1 near the center in FIG. 16.

In step S209, peak levels XaP and XbP of the linear sensors 20Xa and 20Xb, which are stored in the nonvolatile memory 81 in advance, are compared with each other. Since a signal by disturbance light or the like is normally considerably smaller than a signal by a normal light spot, the signal having a larger peak value is employed as normal coordinates. In this way, the coordinate values of the two linear CCDs of the linear sensors 20Xa and 20Xb can be connected at the line L1.

More specifically, when the peak level XaP is higher than the peak level XbP (YES in step S209), the flow advances to step S210 to define CCDX=CCDXa, and then the flow advances to step S212. If the peak level XaP is lower than the peak level XbP (NO in step S209), the flow advances to step S211 to define CCDX=CCDXb, and then the flow advances to step S212.

In step S212, to make the coordinate values on the screen 10 match, screen coordinate conversion is executed to convert the coordinate value CCDX obtained by the above processing into the coordinate value X on the screen 10. This processing will be described later in detail.

Processing for the X-coordinate has been described above. The same processing as described above is executed for the Y-coordinate.

A data signal representing the coordinate values (X, Y) calculated by the above-described calculation processing is sent from the coordinate calculation section 32 to the communication control section 33. The communication control section 33 receives the data signal and a control signal from the control signal detection section 72. The data signal and control signal are converted into communication signals having a predetermined format and sent to an external display control unit. Thus, various operations of operating the cursor on the screen 10, selecting a menu item, and inputting characters and line drawings can be performed.

Setting of Reference Point

To make CCD coordinate values match coordinate values on the screen 10, pieces of information including the magnification used to convert the CCD coordinate values into coordinate values on the screen 10 and the coordinate values of the origin must be determined in advance. For this purpose, the CCD coordinate values of a plurality of known coordinate positions (reference points) are acquired and stored in the nonvolatile memory 81.

Figure 18:
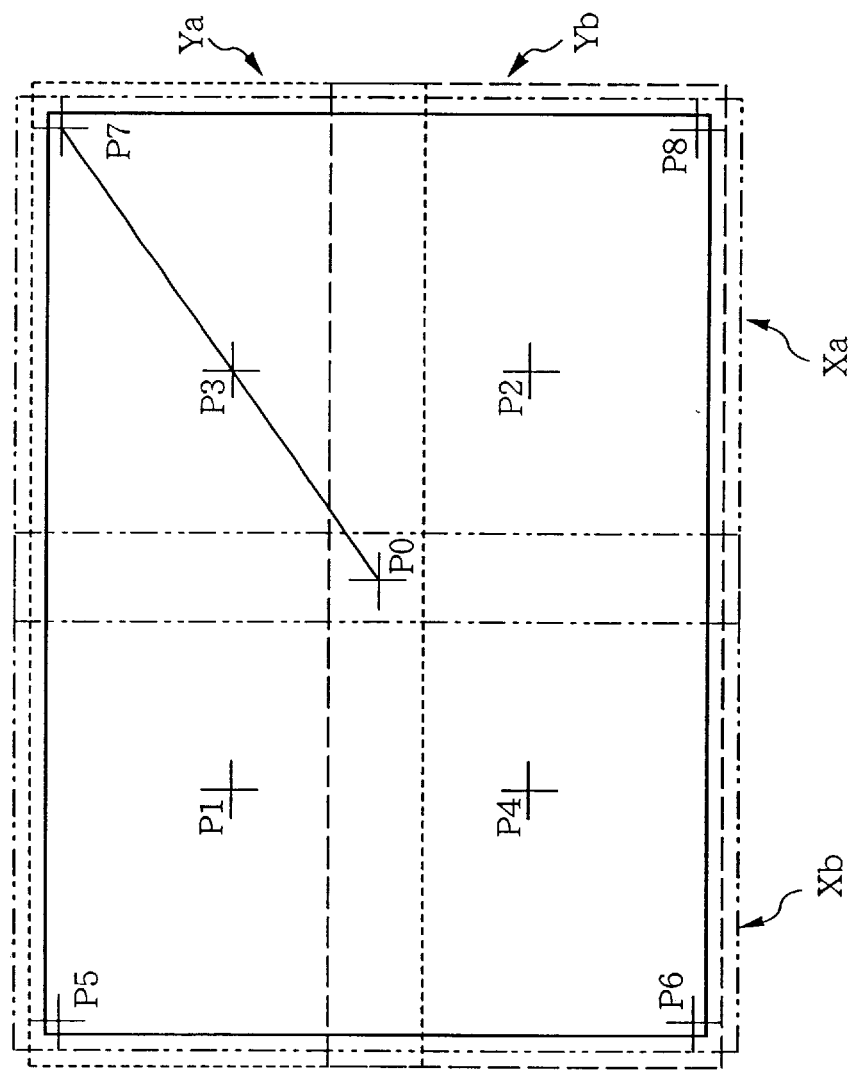
FIG. 18 is a view showing an example of coordinate positions of reference points according to the embodiment.

FIG. 18 is a view showing an example of coordinate positions of reference points according to the embodiment.

First, the origin as a reference is set. A signal is input to a position P0 in FIG. 18, and the CCD coordinate values at that time are stored in the nonvolatile memory 81. When the overlap portion of the linear sensors 20Xa, 20Xb, 20Ya, and 20Yb is set at that position, reference points used to connect the coordinate values on the linear sensors 20Xa, 20Xb, 20Ya, and 20Yb can be simultaneously input.

Next, input for determining the magnification is done at the origin. Actually, when information of a known point separated from the origin is present, the magnification can be calculated.

However, the magnification varies depending on the input position (reference point) due to aberration or variation in lens.

Figure 19:
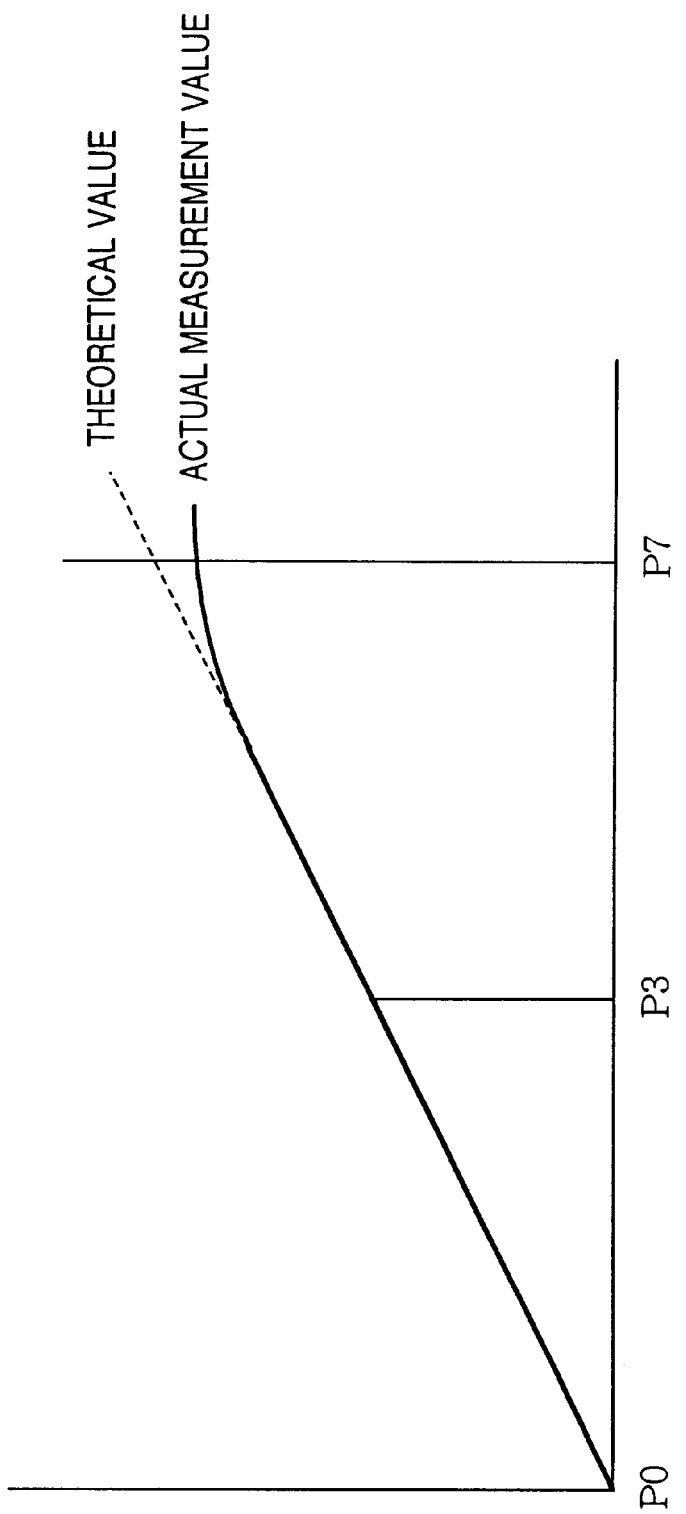
FIG. 19 is a graph showing a variation in magnification depending on the reference point according to the embodiment.

FIG. 19 is a graph showing a variation in magnification depending on the reference point according to the embodiment.

FIG. 19 shows the output of the CCD coordinate values of the reference point.

For example, the theoretical values of the CCD coordinate values between the reference points P0 and P7 in FIG. 18 are represented by a linear data sequence. The actual measurement values of the CCD coordinate values between the reference points P0 and P3 exhibit a linear output of CCD coordinate values, like the theoretical values, though the CCD coordinate values may lose the linearity near the reference point P7 and deviate from the linear data sequence of the theoretical values of the CCD coordinate values. In such a case, when data for the magnification is acquired at the reference point P7 and used for coordinate calculation, an error occurs as a whole.

To determine the magnification, CCD coordinate values of a reference point such as the point P3 where the actual measurement values of the CCD coordinate values, which are relatively similar to the theoretical values of the CCD coordinate values, can be obtained are used.

As described above, since connected coordinate values are obtained using the plurality of linear sensors 20Xa, 20Xb, 20Ya, and 20Yb, ranges where the linear sensors 20Xa, 20Xb, 20Ya, and 20Yb are used are represented by regions Xa, Ya, Xb, and Yb in FIG. 18.

Since the cylindrical lenses 90Xa, 90Xb, 90Ya, and 90Yb themselves are prepared in correspondence with the linear sensors 20Xa, 20Xb, 20Ya, and 20Yb, respectively, each of Xab and Yab has a variation.

Hence, a magnification corresponding to each of the linear sensors 20Xa, 20Xb, 20Ya, and 20Yb must be obtained. To do this, outputs of the linear sensors 20Xa, 20Xb, 20Ya, and 20Yb at reference points P1, P2, and P4, in addition to the reference point P3, are stored in the nonvolatile memory 81.

When the reference point P0 is present at the overlap portion, as shown in FIG. 18, the values of Xab and Yab are acquired at this point. The CCD data of the linear sensors 20Xa, 20Xb, 20Ya, and 20Yb at that time are defined as P0Xa, P0Ya, P0Xb, and P0Yb. The reference point P0 is the origin. In this case, the coordinate values on the screen 10 is (X_P0, Y_P0)=(0, 0).

For magnification determination, the CCD coordinates at the reference point P3 are defined as P3Xa and P3Ya, and the coordinate values on the screen 10 are defined as X_P3 and Y_P3. Magnifications α3x and α3y are given by $$\alpha 3x = (X\_P3 - X\_P0)/(P3Xa - P0Xa) \qquad (1)$$

$$\alpha 3y = (Y\_P3 - Y\_P0)/(P3Ya - P0Ya) \qquad (2)$$

As described above, when the coordinate value CCDX is multiplied by the magnification calculated for each reference point, the coordinate value on the screen 10 can be calculated.

In actual calculation, region determination is done on the basis of the obtained coordinate values CCDX and CCDY, and calculation is performed using magnifications α1, α2, α3, and α4 corresponding to the respective regions.

The magnification at the reference point with good linearity is determined in this way. Since the linearity degrades near the reference point P7 (peripheral portion of the screen 10), as shown in FIG. 18, an error occurs at the peripheral portion of the screen 10.

In an actual device, a margin portion is set outside the effective projection range of the screen 10. If this region is small, input may be limited at some portions, and input to the actual projection range may be impeded at those portions.

In a normal PC use environment, the menu bar or the like may be displayed by moving the cursor to the image peripheral portion. If an error occurs, the operation may be impeded.

To allow input to the peripheral portion of the screen 10 while keeping the magnification unchanged, CCD coordinate values from reference points P5 to P8 are acquired and stored in the nonvolatile memory 81, and used as data of fixed input points. A fixed input point here means a point that always outputs the coordinates of a preset point when input is done at that fixed input point.

That is, when the CCD coordinate values of the fixed input point are obtained, fixed coordinate values on the screen 10 are output independently of the magnification.

If only that point is forced to output fixed coordinate values, the coordinate values abruptly change to degrade the operability. For this reason, the coordinate values must be gradually changed from an appropriate point (e.g., the reference point P3 for the reference point P7).

For the coordinate system, the +X direction is set from the reference point P0 to the right side, and the +Y direction is set from the reference point P0 to the lower side in FIG. 18. When coordinate values obtained by multiplying CCD coordinate values by the magnification are larger than X_P3 and smaller than Y_P3, coordinates are calculated while changing the weight by $$X = (CCDX * \alpha 3x) + (X - X\_P3)/(X\_P7 - X\_P3) * \\ ((Y - Y\_P3)/(Y\_P3 - Y\_P7)) * (X\_P7 - (p7x * \alpha 3x)) \quad (3)$$

$$Y = (CCDY * \alpha 3y) + (X - X\_P3)/(X\_P7 - X\_P3) * \\ ((Y - Y\_P3)/(Y\_P3 - Y\_P7)) * (Y\_P7 - (p7y * \alpha 3y)) \quad (4)$$

For the remaining regions as well, similar calculations are executed using combinations of the reference points P1 and P5, P4 and P6, and P2 and P8.

The above equations are mere examples, and equations of higher order may be used.

In the above way, CCD coordinate values that match the coordinate values on the screen 10 can be calculated. This corresponds to screen coordinate calculation processing in step S212 of FIG. 17.

Details of the processing in step S212 of FIG. 17 will be described with reference to FIG. 20.

Figure 20:
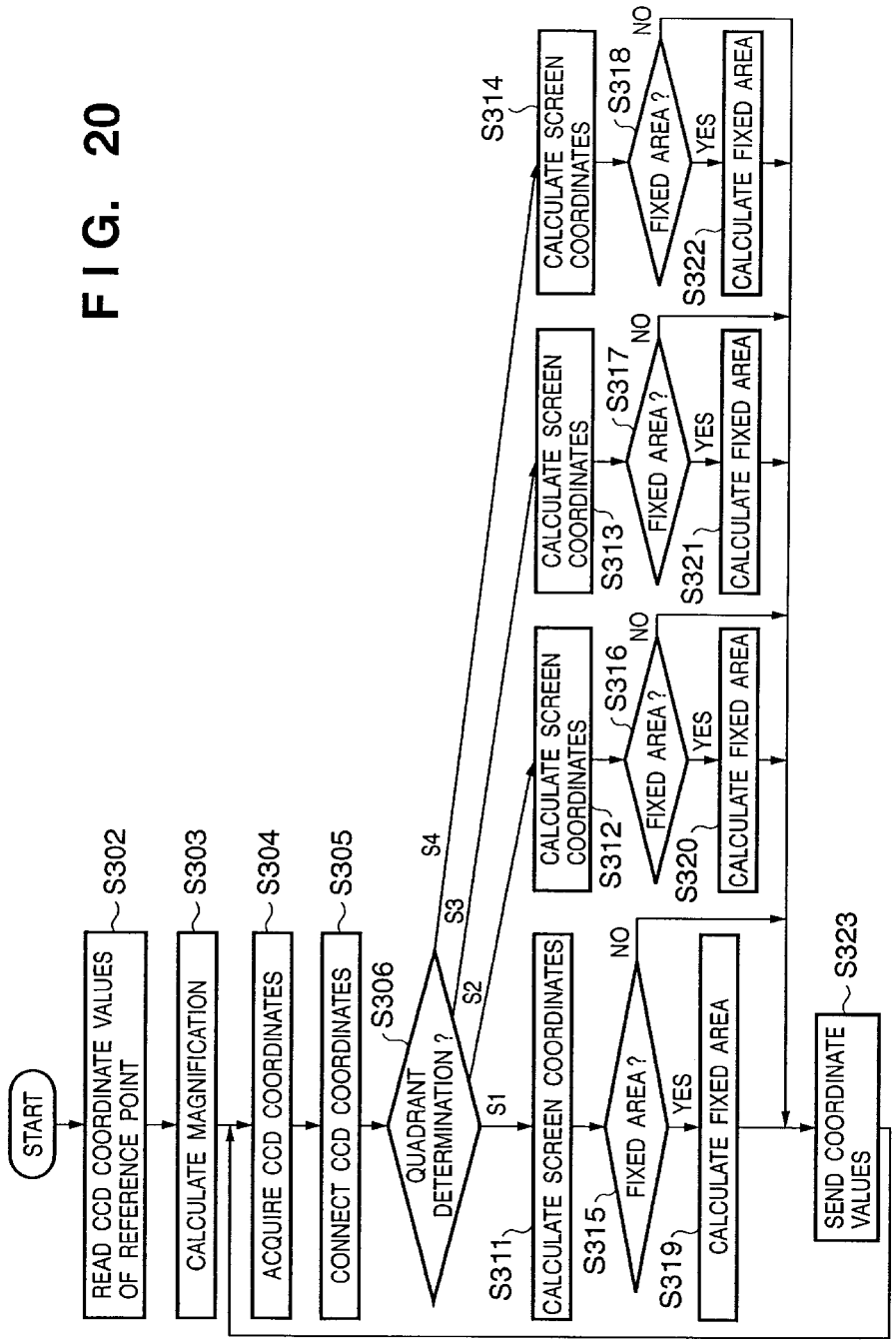
FIG. 20 is a flow chart showing details of processing in step S212 of the embodiment.

FIG. 20 is a flow chart showing details of the processing in step S212 of this embodiment.

In step S302, CCD coordinate values of the reference points P0 to P8 stored in the nonvolatile memory 81 are loaded. Using the CCD coordinate values and known coordinate values corresponding to the reference points P0 to P8 on the screen 10, magnifications are calculated using equations (1) and (2).

In step S304, the input CCD coordinate values of each linear sensor are read. In step S305, the read CCD coordinate values are connected.

In step S306, which quadrant on the screen 10 has the coordinate values is determined on the basis of the connected CCD coordinate values. This determination is done by comparing the coordinate values with the coordinate values of the origin. For example, the first, second, third, and fourth quadrants are defined as S1, S2, S3, and S4, respectively, as shown in FIG. 18.

The processing branches to calculation for the determined quadrant.

For example, a case of the first quadrant S1 will be described. In step S311, the connected CCD coordinate values are multiplied by the magnification for the first quadrant S, thereby calculating the screen coordinates. In step S315, it is determined whether the area is a fixed area where the calculated screen coordinates represent a fixed input point. For the first quadrant S1, this determination is done on the basis of the coordinate values of the reference point P3, as described above. For the remaining quadrants, determination is done in the same way as described above.

If it is determined in step S315 that the area is not a fixed area (NO in step S315), the flow advances to step S323 to output the calculated screen coordinates. If the area is a fixed area (YES in step S315), screen coordinates for the fixed area are calculated using equations (3) and (4). Then, the flow advances to step S323 to output the calculated screen coordinates. After sending the coordinates, the magnifications and the like are already calculated and stored in the memory. Hence, the flow returns to step S304.

The case of the first quadrant S1 has been described above. For the remaining quadrants, the same calculation method as described above can be employed except that the coordinate values of the reference point to be used are different.

In the above way, the CCD coordinate values of each known reference point are acquired and stored in the nonvolatile memory 81. Using the stored CCD coordinate values, the origin, magnification, and fixed input points are calculated, and the coordinates are calculated. Hence, a more accurate coordinate input apparatus can be provided.

To acquire the CCD coordinate values of a plurality of reference points, a device capable of inputting a signal to known input positions may be used, or the CCD coordinate values may be set on the screen at the time of shipment.

For example, when the coordinate values of a reference point on the screen 10 are transmitted to the communication control section 33, the driver on the host computer side displays a cursor at that position on the screen 10. When a signal is input to the cursor position, the CCD coordinate values of the reference point are obtained. When this processing is repeated while sequentially changing the coordinate values to be output, the CCD coordinate values of nine reference points can be input on the host computer side, as shown in FIG. 21.

Figure 21:
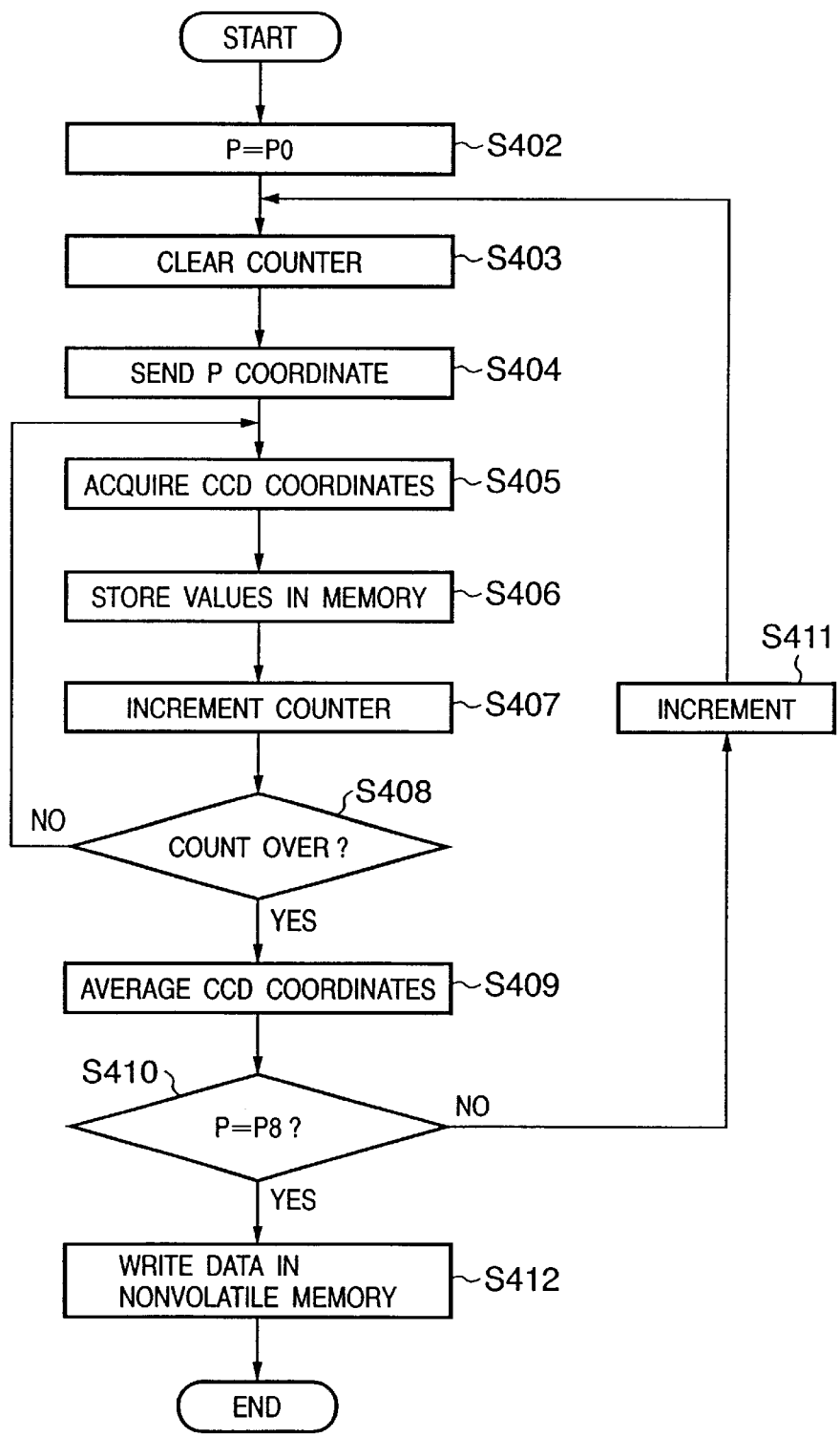
FIG. 21 is a flow chart showing processing of inputting the coordinate values of nine reference points in the embodiment.

FIG. 21 is a flow chart showing processing of inputting the coordinate values of nine reference points in this embodiment.

When a reference point setting mode is set, in step S402, the host computer sets the coordinate values of the reference point P0 on the screen 10 to a reference point Pn (n: 1, 2, ..., 8, 9) at which CCD coordinate values are to be acquired (for the sake of simplicity, no detailed description for each of the X- and Y-coordinates will be made, though both the X- and Y-coordinates are set).

In step S403, a counter for measuring the number of times of acquisition of CCD coordinate values of the reference point Pn is cleared. To more accurately acquire the CCD coordinate values of each reference point, CCD coordinate values of a single reference point are acquired a plurality of number of times, and the average value of the plurality of acquired CCD coordinate values is used as the CCD coordinate values of the reference point. The number of times of acquisition is determined on the basis of the required accuracy in accordance with the device state such as noise.

In step S404, the coordinate values of each reference point set in advance are output. In step S405, CCD coordinates corresponding to the reference points are acquired and stored in the nonvolatile memory 81. In step S407, the counter for the number of times of acquisition is incremented. In step S408, it is determined whether the coordinate values are acquired a predetermined number of times.

If the number of times of acquisition is smaller than the predetermined number of times (NO in step S408), the flow returns to step S405. If the number of times of acquisition has reached the predetermined number of times (YES in step S408), the flow advances to step S409 to calculate the average of the plurality of CCD coordinate values acquired for a single reference point. The average CCD coordinate values are stored in a memory prepared for each reference point.

It is determined in step S410 whether the point to be processed is the last reference point Pn. If the point to be processed is not the last reference point Pn (NO in step S410), the flow advances to step S411 to increment the reference point Pn to be processed, and the flow returns to step S403. If the point to be processed is the last reference point Pn (YES in step S410), the obtained CCD coordinate values of each reference point are stored in the nonvolatile memory in step S412.

This operation may be executed every time the device is powered on but is generally executed at the time of shipment because the user operation becomes cumbersome and no accuracy can be ensured.

However, for a device using a projector of this type, the screen size can easily be changed by changing the distance between the projection display device 8 and screen 10 of the coordinate input apparatus. That is, the screen size can be changed to a size desired by the user after the shipment.

Figure 22:
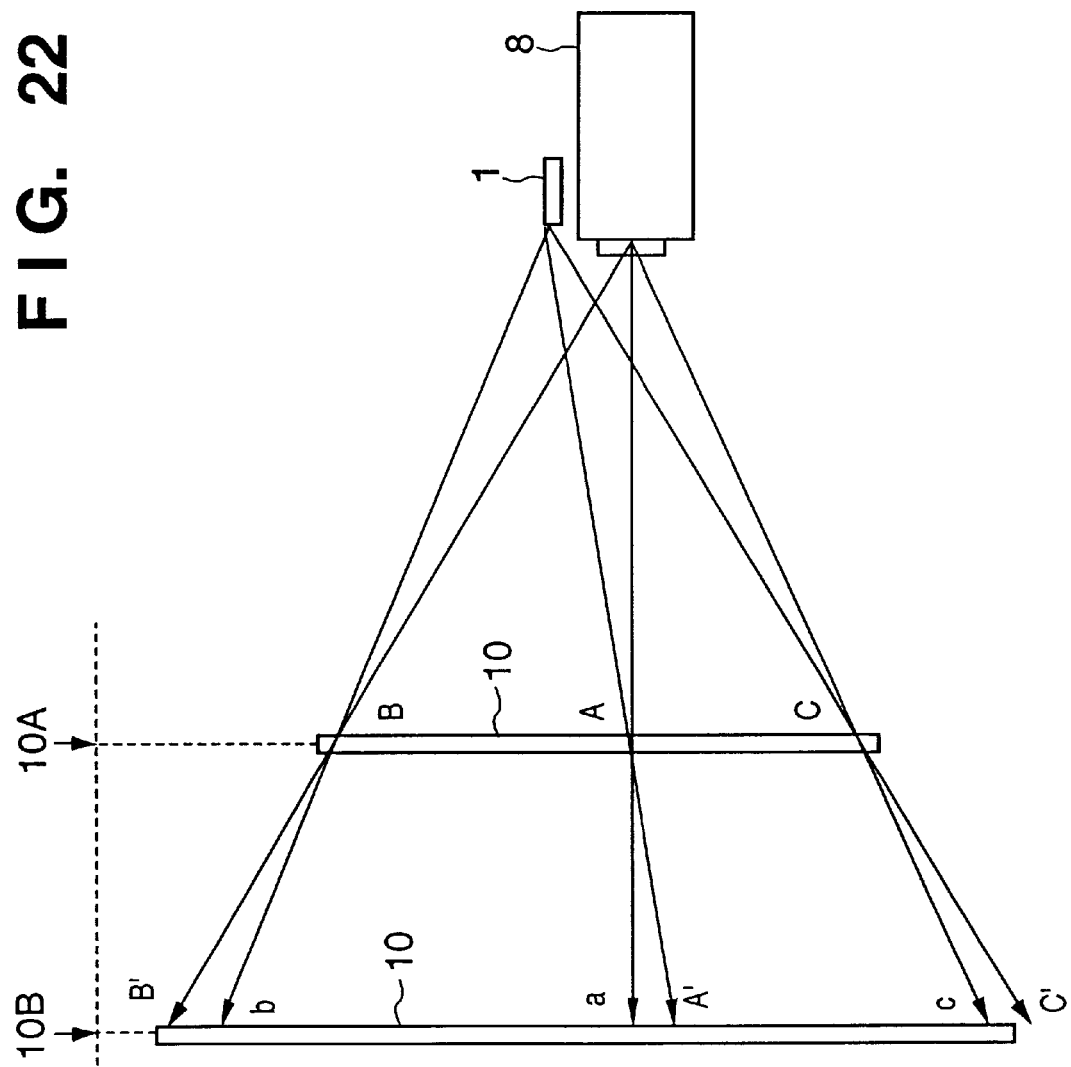
FIG. 22 is a view showing the relationship between coordinate values in changing the screen size in the embodiment.

FIG. 22 is a view showing the relationship between coordinate values in changing the screen size in the embodiment.

When the position of the screen 10 is changed from a position 10A at which an image is normally projected from the projection display device 8 to the screen 10 to a position 10B, an image with a larger size can be obtained.

If the position of the coordinate detector 1 is not set on the optical axis of the projection display device 8, the positions of points A', B', and C' on the screen 10 at the position 10B are calculated as the positions of points A, B, and C, which match the image input points on the screen 10 at the position 10A. For this reason, the actual input points deviate from the display points.

To prevent this deviation, reference points stored in the nonvolatile memory 81 at the time of shipment when the screen 10 is set at the position 10B and CCD coordinate values at each set position of the screen 10 are stored in advance in the nonvolatile memory 81 in correspondence with each other. With this arrangement, even when the position of the screen 10 is changed, the coordinate values can be appropriately calculated using common reference points.

Figure 23:
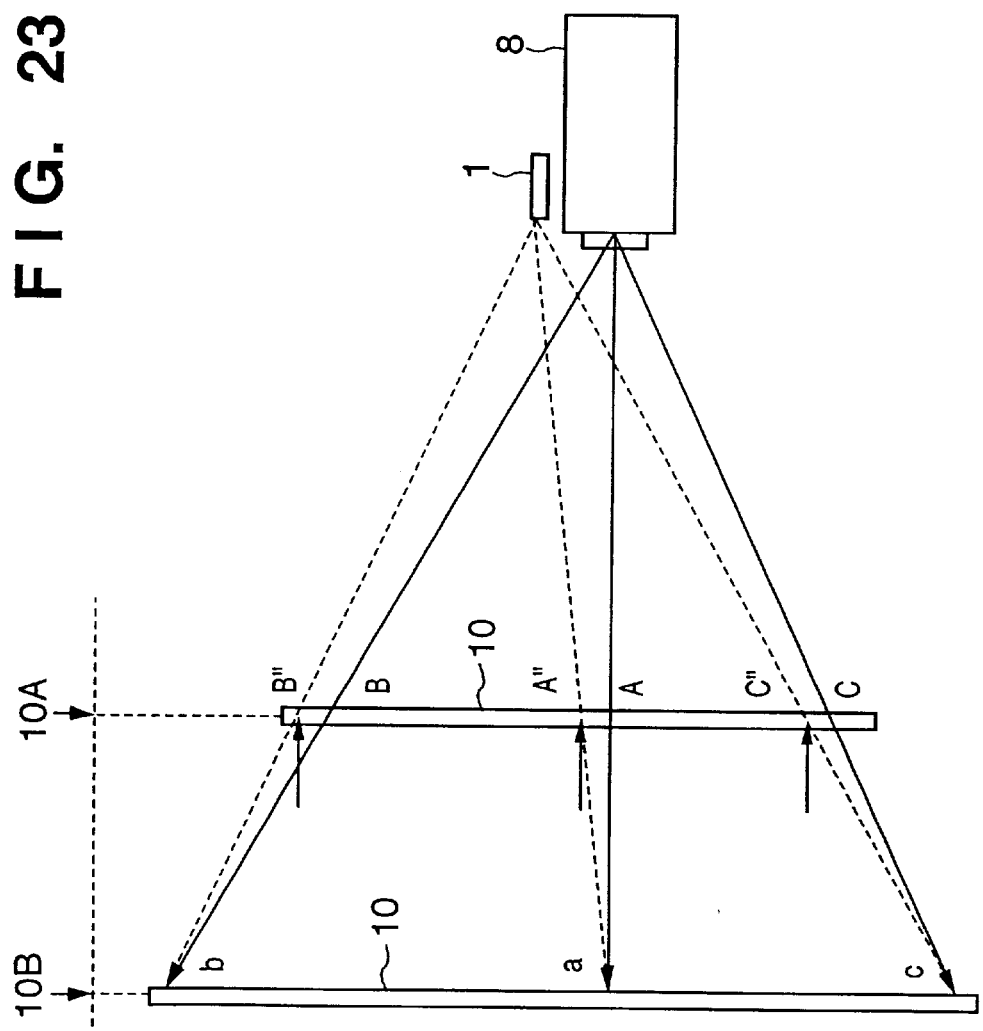
FIG. 23 is a view showing the concept of coordinate value calculation when the screen size has been changed in the embodiment.

FIG. 23 is a view showing the concept of coordinate value calculation when the screen size has been changed in the embodiment.

Assume that an image which is displayed at the point A on the screen 10 at the position 10A is displayed at a point a on the screen 10 at the position 10B. When viewed from the coordinate detector 1, the point a corresponds to a point A" on the screen 10 at the position 10A. Similarly, a point b corresponds to a point B", and a point c corresponds to a point C".

In inputting the nine reference points as described above, two types of screen coordinate values are set for each reference point.

That is, as a coordinate value for a reference point P3X, a coordinate value X0_P3 on the screen 10 at the position 10A and a coordinate value X1_P3 on the screen 10 at the position 10B are set. In this way, the coordinate values of the reference points at the respective positions are stored in the nonvolatile memory 81.

To select coordinate values on the screen 10 at one of a plurality of positions, for example, a switch 80 (FIG. 5) is provided on the coordinate detector 1 to select coordinate values by turning on/off the switch 80. For example, when the switch 80 is OFF, coordinates are calculated using coordinate values on the screen 10 at the position 10A. When the switch 80 is ON, coordinates are calculated using coordinate values obtained by mapping coordinate values on the screen 10 at the position 10B to the screen 10 at the position 10A. If a reference point used to connect the CCD coordinate values of a plurality of linear sensors matches the reference point P0, the connected CCD coordinate values deviate from the actual input position. This deviation (offset) contains a component corresponding to the projection position of the reference point P0. Hence, in calculating coordinate values on the screen 10 at the position 10B, the offset component must be adjusted.

Screen coordinate calculation processing in adjusting this offset component will be described below with reference to FIG. 24.

Figure 24:
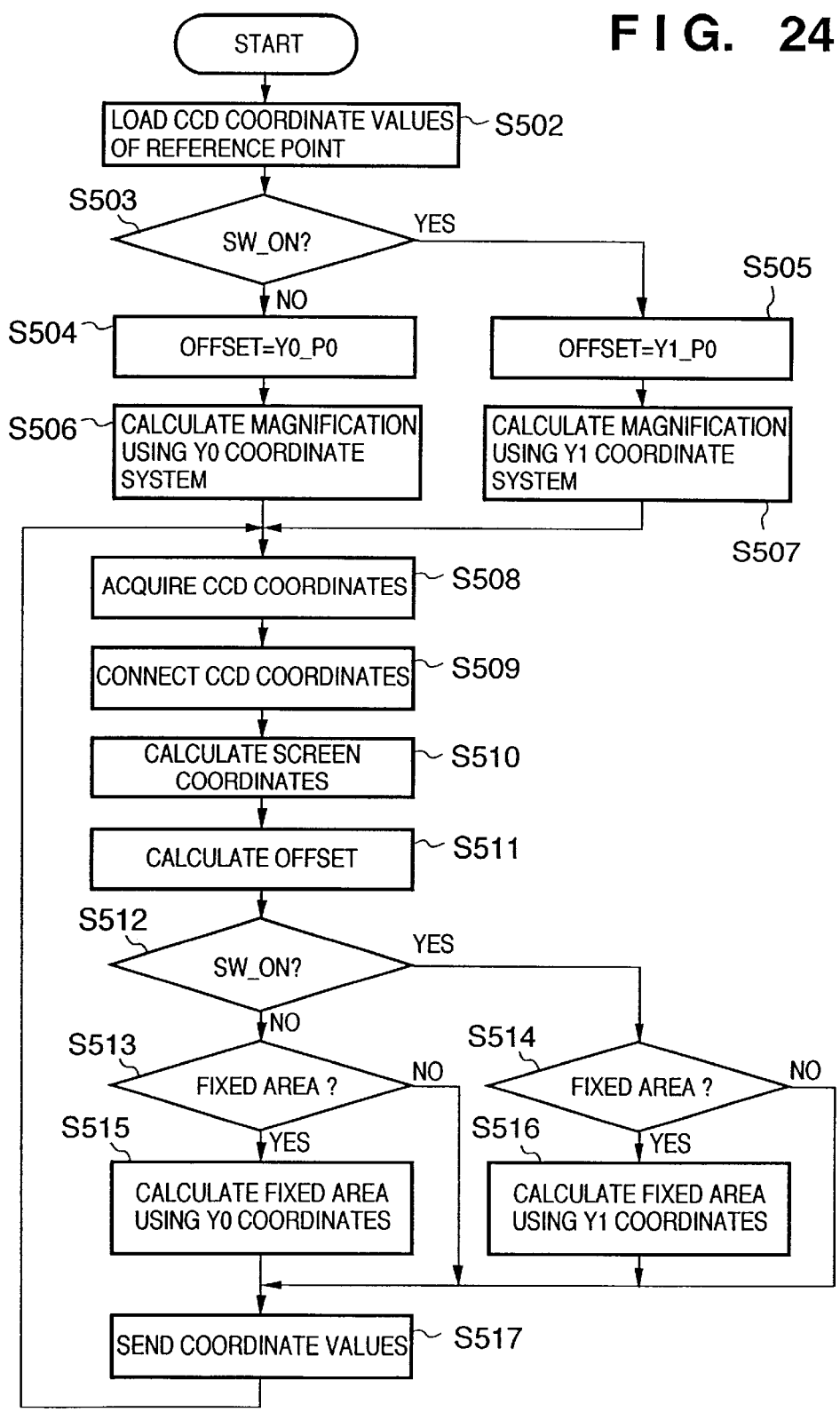
FIG. 24 is a flow chart showing screen coordinate calculation processing in adjusting the offset component in the embodiment.

FIG. 24 is a flow chart showing screen coordinate calculation processing in adjusting the offset component in this embodiment.

For the sake of simplicity, this flow chart omits quadrant determination described with reference to FIG. 20. The position 10A shown in FIGS. 22 and 23 is defined as normal position, and a coordinate system corresponding to this position is defined as a Y0 coordinate system. A coordinate system corresponding to the position 10B is defined as a Y1 coordinate system. Although the two coordinate systems are used here, the number of coordinate systems is not limited to this, and coordinate systems can be formed in correspondence with a plurality of positions.

In step S502, the CCD coordinate values of reference points stored in the nonvolatile memory 81 are loaded. In step S503, the state of the switch 80 of the coordinate detector 1 is read. It is determined whether the switch 80 is ON. That is, it is determined which coordinate system, the Y0 coordinate system or Y1 screen size, is used. If the switch 80 is OFF (NO in step S503), the flow advances to step S504 to write register OFFSET=Y0_P0(0) as an offset value for normal calculation. In step S506, the magnification is calculated on the normal Y0 coordinate system.

If the switch 80 is OFF (YES in step S503), the flow advances to step S505 to write register OFFSET=Y1_P0 as an offset value. In step S507, the magnification is calculated on the Y1 coordinate system.

In step S508, the input CCD coordinate values of each linear sensor are read out. In step S509, the readout CCD coordinate values are connected.

In step S510, screen coordinates are calculated by multiplying the connected CCD coordinate values by the calculated magnification. The screen coordinates calculated here contain an offset component, as described above. Hence, in step S511, the value written in the register OFFSET is added to correct the offset. In this example, the screen coordinates on the screen coordinate system are calculated, and then, the offset is corrected. However, the correction may be done by converting the offset of the reference point P0 into CCD coordinate values.

In step S512, the state of the switch 80 of the coordinate detector 1 is read, and it is determined whether the switch 80 is OFF. If the switch 80 is OFF (NO in step S512), the flow advances to step S513. It is determined in step S513 whether the area is a fixed area where the calculated screen coordinates represent a fixed input point. If it is determined in step S513 that the area is not a fixed area (NO in step S513), the flow advances to step S517 to output the calculated screen coordinates. If the area is a fixed area (YES in step S513), the flow advances to step S515 to calculate screen coordinates for the fixed area using the Y0 coordinate system. Then, the flow advances to step S517 to output the calculated screen coordinates. After sending the coordinates, as the magnifications and the like are already calculated and stored in the memory, the flow returns to step S508.

If it is determined that the switch 80 is ON (YES in step S512), it is determined in step S514 whether the area is a fixed area where the calculated screen coordinates represent a fixed input point. If it is determined in step S514 that the area is not a fixed area (NO in step S514), the flow advances to step S517 to output the calculated screen coordinates. If the area is a fixed area (YES in step S514), the flow advances to step S516 to calculate screen coordinates for the fixed area using the Y1 coordinate system. Then, the flow advances to step S517 to output the calculated screen coordinates. After sending the coordinates, as the magnifications and the like are already calculated and stored in the memory, the flow returns to step S508.

As described above, according to this embodiment, the CCD coordinate values of each known reference point are stored in the nonvolatile memory 81 in correspondence with each set position of the screen. The origin, magnification, and fixed points used to final coordinate values on the screen 10 are calculated from the CCD coordinate values corresponding to the screen position, and the coordinates are calculated. Hence, an accurate coordinate input apparatus can be provided. In addition, even when the screen position is changed, coordinates can be always accurately calculated using CCD coordinate values of appropriate reference points.

The object of the present invention is achieved even by supplying a storage medium which stores software program codes for implementing the functions of the above-described embodiment to a system or apparatus and causing the computer (or a CPU or MPU) of the system or apparatus to read out and execute the program codes stored in the storage medium.

In this case, the program codes read out from the storage medium implement the functions of the above-described embodiment by themselves, and the storage medium which stores the program codes constitutes the present invention.

As the storage medium for supplying the program codes, for example, a floppy disk, hard disk, optical disk, magnetooptical disk, CD-ROM, CD-R, magnetic tape, nonvolatile memory card, ROM, or the like can be used.

The functions of the above-described embodiment are implemented not only when the readout program codes are executed by the computer but also when the operating system (OS) running on the computer performs part or all of actual processing on the basis of the instructions of the program codes.

The functions of the above-described embodiment are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the storage medium, it stores program codes corresponding to the above-described flow charts shown in FIGS. 15, 17, 20, 21, and 24.

As many apparently widely different embodiments of the present invention can be made without departing from the spirit and scope thereof, it is to be understood that the invention is not limited to the specific embodiments thereof except as defined in the appended claims.

What is claimed is:

1. A coordinate input apparatus which detects light from a pointing device, with which a coordinate input screen is irradiated, by a coordinate detector, thereby generating a coordinate output signal corresponding to a position on the coordinate input screen, which is irradiated with the light, comprising:

storage means for storing a plurality of coordinate values corresponding to outputs from the coordinate detector which are obtained by irradiating a predetermined position on each of a plurality of coordinate input screens with the light, wherein each of the plurality of coordinate input screens is set at different set positions against a direction along an optical axis between the coordinate input screen and the coordinate detector;

selection means for selecting a predetermined coordinate input screen from said plurality of coordinate input screens and for selecting coordinate values from the plurality of coordinate values stored by said storage means, which correspond to said predetermined coordinate input screen selected from said plurality of coordinate input screens; and arithmetic means for calculating the position on the predetermined coordinate input screen selected from said plurality of coordinate input screens, which is irradiated with the light, on the basis of the selected coordinate values.

2. The apparatus according to claim 1, wherein said arithmetic means determines an origin on the coordinate input screen on the basis of the outputs from the coordinate detector which are obtained by irradiating the predetermined position on each of the plurality of coordinate input screens with the light.

3. The apparatus according to claim 1, wherein said arithmetic means determines a magnification to be used to calculate the coordinate values on the coordinate input screen on the basis of the outputs from the coordinate detector which are obtained by irradiating the predetermined position on each of the plurality of coordinate input screens with the light.

4. The apparatus according to claim 1, wherein said arithmetic means determines a fixed input point on the coordinate input screen on the basis of the outputs from the coordinate detector which are obtained by irradiating the predetermined position on each of the plurality of coordinate input screens with the light.

5. A control method for a coordinate input apparatus which detects light from a pointing device, with which a coordinate input screen is irradiated, by a coordinate detector, thereby generating a coordinate output signal corresponding to a position on the coordinate input screen, which is irradiated with the light, comprising:

a storage step of storing a plurality of coordinate values corresponding to outputs from the coordinate detector which are obtained by irradiating a predetermined position on each of a plurality of coordinate input screens with the light, wherein each of the plurality of coordinate input screens is set at different set positions against a direction along an optical axis between the coordinate input screen and the coordinate detector;

a selection step of selecting a predetermined coordinate input screen from the plurality of coordinate input screens and for selecting coordinate values from the plurality of coordinate values stored in the storage step, which corresponds to the predetermined coordinate input screen selected from the plurality of coordinate input screens; and an arithmetic step of calculating the position on the predetermined coordinate input screen selected from the plurality of coordinate input screens, which is irradiated with the light, on the basis of the coordinate values selected in the selection step.

6. The method according to claim 5, wherein in the arithmetic step, an origin on the coordinate input screen is determined on the basis of the outputs from the coordinate detector which are obtained by irradiating the predetermined position on each of the plurality of coordinate input screens with the light.

7. The method according to claim 5, wherein in the arithmetic step, a magnification to be used to calculate the coordinate values on the coordinate input screen is determined on the basis of the outputs from the coordinate detector which are obtained by irradiating the predetermined position on each of the plurality of coordinate input screens with the light.

8. The method according to claim 5, wherein in the arithmetic step, a fixed input point on the coordinate input screen is determined on the basis of the outputs from the coordinate detector which are obtained by irradiating the predetermined position on each of the plurality of coordinate input screens with the light.

9. A computer-readable memory which stores a program for causing a computer to control a coordinate input apparatus which detects light from a pointing device, with which a coordinate input screen is irradiated, by a coordinate detector, thereby generating a coordinate output signal corresponding to a position on the coordinate input screen, which is irradiated with the light, said program comprising:

a program code for a storage step of storing a plurality of coordinate values corresponding to outputs from the coordinate detector which are obtained by irradiating a predetermined position on each of a plurality of coordinate input screens with the light, wherein each of the plurality of coordinate input screens is set at different set positions against a direction along an optical axis between the coordinate input screen and the coordinate detector;

a program code for a selection step of selecting a predetermined coordinate input screen from the plurality of coordinate input screens and for selecting coordinate values from the plurality of coordinate values stored in the storage step, which correspond to the predetermined coordinate input screen selected from the plurality of coordinate input screens; and a program code for an arithmetic step of calculating the position on the predetermined coordinate input screen selected from the plurality of coordinate input screens, which is irradiated with the light, on the basis of the coordinate values selected in the selection step.

* * * * *

UNITED STATES PATENT AND TRADEMARK OFFICE
CERTIFICATE OF CORRECTION

PATENT NO. : 6,795,061 B2
DATED : September 21, 2004
INVENTOR(S) : Atsushi Tanaka It is certified that error appears in the above-identified patent and that said Letters Patent is hereby corrected as shown below:

<u>Column 14,</u>
Line 1, "quadrant S," should read -- quadrant S1, --.

Signed and Sealed this

Fourth Day of January, 2005

JON W. DUDAS
*Director of the United States Patent and Trademark Office*